United States Patent
Dimou et al.

(10) Patent No.: US 12,477,556 B2
(45) Date of Patent: Nov. 18, 2025

(54) TECHNIQUES FOR COMMUNICATING HYBRID AUTOMATIC REPEAT REQUEST FEEDBACK

(71) Applicant: QUALCOMM Incorporated, San Diego, CA (US)

(72) Inventors: Konstantinos Dimou, New York, NY (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 402 days.

(21) Appl. No.: 18/150,158

(22) Filed: Jan. 4, 2023

(65) Prior Publication Data

US 2023/0224917 A1 Jul. 13, 2023

Related U.S. Application Data

(60) Provisional application No. 63/298,433, filed on Jan. 11, 2022.

(51) Int. Cl.
*H04W 72/23* (2023.01)
*H04L 1/1812* (2023.01)
*H04W 72/0446* (2023.01)
*H04W 72/11* (2023.01)

(52) U.S. Cl.
CPC .......... *H04W 72/23* (2023.01); *H04L 1/1812* (2013.01); *H04W 72/0446* (2013.01); *H04W 72/11* (2023.01)

(58) Field of Classification Search
CPC . H04W 72/23; H04W 72/11; H04W 72/0446; H04L 1/1614; H04L 1/1685; H04L 1/1812; H04L 1/1822; H04L 1/1825; H04L 1/1854; H04L 1/1893; H04L 1/1896
See application file for complete search history.

(56) References Cited

U.S. PATENT DOCUMENTS

| | | | | |
|---|---|---|---|---|
| 11,489,633 | B2* | 11/2022 | Sarkis | H04W 72/51 |
| 11,910,429 | B2* | 2/2024 | Hosseini | H04W 72/23 |
| 11,924,840 | B2* | 3/2024 | Elshafie | H04L 5/0055 |
| 2021/0014026 | A1* | 1/2021 | Papasakellariou | H04L 1/1861 |
| 2021/0037484 | A1* | 2/2021 | Zhou | H04W 52/386 |
| 2021/0218503 | A1* | 7/2021 | Babaei | H04L 1/08 |

(Continued)

*Primary Examiner* — Bailor C Hsu
(74) *Attorney, Agent, or Firm* — QUALCOMM Incorporated

(57) ABSTRACT

Methods, systems, and devices for wireless communications are described. A user equipment (UE) may defer transmission of a first feedback message to a target transmission time interval (TTI). During a reception time interval, a base station may transmit, to the UE, downlink control information (DCI) that triggers the UE to schedule a second feedback message, where the first feedback message and the second feedback message are associated with different types of hybrid automatic repeat request (HARQ) codebooks. The UE may compare a minimum processing time of the UE with a time difference between the reception time interval and the target TTI and determine (e.g., evaluate) whether to cancel transmission of the first feedback message based on the comparison. In accordance with the determining, the UE may transmit at least one of the first feedback message or the second feedback message.

30 Claims, 18 Drawing Sheets

(56) References Cited

U.S. PATENT DOCUMENTS

| | | | |
|---|---|---|---|
| 2021/0320760 A1* | 10/2021 | Rastegardoost | H04L 1/1854 |
| 2022/0104234 A1* | 3/2022 | Yang | H04L 1/1854 |
| 2022/0109528 A1* | 4/2022 | Babaei | H04W 72/04 |
| 2022/0183038 A1* | 6/2022 | Saber | H04L 1/1896 |
| 2022/0217715 A1* | 7/2022 | Bae | H04W 72/21 |
| 2022/0337356 A1* | 10/2022 | Dimou | H04L 1/1822 |
| 2022/0353017 A1* | 11/2022 | Babaei | H04L 1/1812 |

* cited by examiner

TECHNIQUES FOR COMMUNICATING HYBRID AUTOMATIC REPEAT REQUEST FEEDBACK

CROSS REFERENCE

The present application for patent claims the benefit of U.S. Provisional Patent Application No. 63/298,433 by Dimou et al., entitled "TECHNIQUES FOR COMMUNICATING HYBRID AUTOMATIC REPEAT REQUEST FEEDBACK," filed Jan. 11, 2022, assigned to the assignee hereof, and expressly incorporated by reference herein.

FIELD OF TECHNOLOGY

The following relates to wireless communications, including techniques for communicating hybrid automatic repeat request (HARQ) feedback.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE and a base station may communicate hybrid automatic repeat request (HARQ) feedback to increase the likelihood that data is received successfully. Techniques for improving HARQ feedback communication may be desired.

SUMMARY

The described techniques relate to improved methods, systems, devices, and apparatuses that support techniques for communicating hybrid automatic repeat request (HARQ) feedback. Generally, the described techniques provide for managing HARQ feedback communication based on a minimum processing time of a user equipment (UE) to cancel a transmission of deferred HARQ feedback. For example, the UE and a base station may communicate according to a semi-persistent scheduling (SPS) configuration. In some examples, the UE may defer SPS-based HARQ feedback from a scheduled transmission time interval (TTI) to a target TTI, such as to a first (e.g., next) available physical uplink control channel (PUCCH) occasion in time after the scheduled TTI. In some cases, the UE may receive, from the base station, downlink control information (DCI) during a reception time interval between the scheduled TTI and the target TTI that triggers the UE to schedule a transmission of HARQ feedback in accordance with a type 3 HARQ codebook or a dynamic grant HARQ codebook (e.g., a type 1 dynamic grant HARQ codebook, a type 2 dynamic grant HARQ codebook). In response to receiving the DCI, the UE may determine (e.g., evaluate) whether to cancel transmission of the deferred HARQ feedback based on the minimum processing time of the UE.

For example, the UE may compare the minimum processing time of the UE with a time difference between the reception time interval and the target TTI (e.g., a time difference between reception of the DCI and transmission of the deferred HARQ feedback) to determine whether the time difference is greater than or less than the minimum processing time. The time difference being greater than the minimum processing time of the UE may indicate that the UE is capable of canceling transmission of the deferred HARQ feedback (e.g., has sufficient time prior to the target TTI to cancel transmission of the deferred HARQ feedback). The time difference being less than the minimum processing time of the UE may indicate that the UE is incapable of canceling the transmission of the deferred HARQ feedback prior to the target TTI. Accordingly, based on the comparison, the UE may cancel the transmission of the deferred HARQ feedback and transmit the HARQ feedback in accordance with the type 3 or dynamic grant HARQ codebook or may transmit both the deferred HARQ feedback and the HARQ feedback in accordance with the type 3 or dynamic grant HARQ codebook.

A method for wireless communication at a UE is described. The method may include deferring, to a target TTI, transmission of a first feedback message that is in accordance with a first type of HARQ codebook, receiving, from a network device and during a reception time interval, DCI that triggers the UE to schedule a second feedback message that is in accordance with a second type of HARQ codebook that is different from the first type of HARQ codebook, determining whether to cancel transmission of the first feedback message during the target TTI based on a minimum processing time of the UE and a time difference between the reception time interval and the target TTI, and transmitting at least one of the first feedback message or the second feedback message in accordance with the determining.

An apparatus for wireless communication at a UE is described. The apparatus may include a processor, memory coupled with the processor, and instructions stored in the memory. The instructions may be executable by the processor to cause the apparatus to defer, to a target TTI, transmission of a first feedback message that is in accordance with a first type of HARQ codebook, receive, from a network device and during a reception time interval, DCI that triggers the UE to schedule a second feedback message that is in accordance with a second type of HARQ codebook that is different from the first type of HARQ codebook, determine whether to cancel transmission of the first feedback message during the target TTI based on a minimum processing time of the UE and a time difference between the reception time interval and the target TTI, and transmit at least one of the first feedback message or the second feedback message in accordance with the determining.

Another apparatus for wireless communication at a UE is described. The apparatus may include means for deferring, to a target TTI, transmission of a first feedback message that is in accordance with a first type of HARQ codebook, means for receiving, from a network device and during a reception time interval, DCI that triggers the UE to schedule a second feedback message that is in accordance with a second type of HARQ codebook that is different from the first type of HARQ codebook, means for determining whether to cancel transmission of the first feedback message during the target TTI based on a minimum processing time of the UE and a time difference between the reception time interval and the target TTI, and means for transmitting at least one of the first feedback message or the second feedback message in accordance with the determining.

A non-transitory computer-readable medium storing code for wireless communication at a UE is described. The code may include instructions executable by a processor to defer, to a target TTI, transmission of a first feedback message that is in accordance with a first type of HARQ codebook, receive, from a network device and during a reception time interval, DCI that triggers the UE to schedule a second feedback message that is in accordance with a second type of HARQ codebook that is different from the first type of HARQ codebook, determine whether to cancel transmission of the first feedback message during the target TTI based on a minimum processing time of the UE and a time difference between the reception time interval and the target TTI, and transmit at least one of the first feedback message or the second feedback message in accordance with the determining.

Some examples of the method, apparatuses, and non-transitory computer-readable medium described herein may further include operations, features, means, or instructions for transmitting, to the network device and before deferring the transmission of the first feedback message, a capability message that indicates the minimum processing time of the UE.

Some examples of the method, apparatuses, and non-transitory computer-readable medium described herein may further include operations, features, means, or instructions for canceling transmission of the first feedback message during the target TTI based on the time difference between the reception time interval and the target TTI being greater than the minimum processing time.

In some examples of the method, apparatuses, and non-transitory computer-readable medium described herein, the second feedback message may be transmitted during a scheduled TTI that overlaps with the target TTI based on canceling transmission of the first feedback message.

In some examples of the method, apparatuses, and non-transitory computer-readable medium described herein, the DCI requests for the UE to include feedback for the first feedback message in the second feedback message based on the time difference between the reception time interval and the target TTI being greater than the minimum processing time.

In some examples of the method, apparatuses, and non-transitory computer-readable medium described herein, transmitting at least one of the first feedback message or the second feedback message may include operations, features, means, or instructions for transmitting the first feedback message during the target TTI based on the time difference between the reception time interval and the target TTI being less than the minimum processing time and transmitting the second feedback message during a second TTI after the target TTI.

In some examples of the method, apparatuses, and non-transitory computer-readable medium described herein, the first feedback message may be associated with an SPS configuration according to which the UE and the network device communicate.

In some examples of the method, apparatuses, and non-transitory computer-readable medium described herein, the first type of HARQ codebook may be a type 1 HARQ codebook or a type 2 HARQ codebook and the second type of HARQ codebook may be a type 3 HARQ codebook or a dynamic grant HARQ codebook.

In some examples of the method, apparatuses, and non-transitory computer-readable medium described herein, the minimum processing time of the UE may be a same value as a physical uplink shared channel (PUSCH) processing value of the UE.

A method for wireless communication at a network device is described. The method may include determining that a UE is configured to defer, to a target TTI, transmission of a first feedback message that is in accordance with a first type of HARQ codebook, transmitting, for reception during a reception time interval, DCI that triggers the UE to schedule a second feedback message that is in accordance with a second type of HARQ codebook that is different from the first type of HARQ codebook, determining whether the UE is to cancel transmission of the first feedback message during the target TTI based on a minimum processing time of the UE and a time difference between the reception time interval and the target TTI, and receiving at least one of the first feedback message or the second feedback message in accordance with the determining.

An apparatus for wireless communication at a network device is described. The apparatus may include a processor, memory coupled with the processor, and instructions stored in the memory. The instructions may be executable by the processor to cause the apparatus to determine that a UE is configured to defer, to a target TTI, transmission of a first feedback message that is in accordance with a first type of HARQ codebook, transmit, for reception during a reception time interval, DCI that triggers the UE to schedule a second feedback message that is in accordance with a second type of HARQ codebook that is different from the first type of HARQ codebook, determine whether the UE is to cancel transmission of the first feedback message during the target TTI based on a minimum processing time of the UE and a time difference between the reception time interval and the target TTI, and receive at least one of the first feedback message or the second feedback message in accordance with the determining.

Another apparatus for wireless communication at a network device is described. The apparatus may include means for determining that a UE is configured to defer, to a target TTI, transmission of a first feedback message that is in accordance with a first type of HARQ codebook, means for transmitting, for reception during a reception time interval, DCI that triggers the UE to schedule a second feedback message that is in accordance with a second type of HARQ codebook that is different from the first type of HARQ codebook, means for determining whether the UE is to cancel transmission of the first feedback message during the target TTI based on a minimum processing time of the UE and a time difference between the reception time interval and the target TTI, and means for receiving at least one of the first feedback message or the second feedback message in accordance with the determining.

A non-transitory computer-readable medium storing code for wireless communication at a network device is described. The code may include instructions executable by a processor to determine that a UE is configured to defer, to a target TTI, transmission of a first feedback message that is in accordance with a first type of HARQ codebook, transmit, for reception during a reception time interval, DCI that triggers the UE to schedule a second feedback message that is in accordance with a second type of HARQ codebook that is different from the first type of HARQ codebook, determine whether the UE is to cancel transmission of the first feedback message during the target TTI based on a minimum processing time of the UE and a time difference between the reception time interval and the target TTI, and receive at least one of the first feedback message or the second feedback message in accordance with the determining.

Some examples of the method, apparatuses, and non-transitory computer-readable medium described herein may further include operations, features, means, or instructions for receiving, from the UE, a capability message that indicates the minimum processing time of the UE.

Some examples of the method, apparatuses, and non-transitory computer-readable medium described herein may further include operations, features, means, or instructions for determining that the UE may be to cancel the transmission of the first feedback message during the target TTI based on the time difference between the reception time interval and the target TTI being greater than the minimum processing time.

In some examples of the method, apparatuses, and non-transitory computer-readable medium described herein, the second feedback message may be received during a scheduled TTI that overlaps with the target TTI based on the transmission of the first feedback message during the target TTI being canceled.

In some examples of the method, apparatuses, and non-transitory computer-readable medium described herein, the DCI requests for the UE to include feedback for the first feedback message in the second feedback message based on the time difference between the reception time interval and the target TTI being greater than the minimum processing time.

In some examples of the method, apparatuses, and non-transitory computer-readable medium described herein, receiving at least one of the first feedback message or the second feedback message may include operations, features, means, or instructions for receiving the first feedback message during the target TTI based on the time difference between the reception time interval and the target TTI being less than the minimum processing time and receiving the second feedback message during a second TTI after the target TTI.

In some examples of the method, apparatuses, and non-transitory computer-readable medium described herein, the first feedback message may be associated with a SPS configuration according to which the UE and the network device communicate.

In some examples of the method, apparatuses, and non-transitory computer-readable medium described herein, the first type of HARQ codebook may be a type 1 HARQ codebook or a type 2 HARQ codebook and the second type of HARQ codebook may be a type 3 HARQ codebook or a dynamic grant HARQ codebook.

In some examples of the method, apparatuses, and non-transitory computer-readable medium described herein, the minimum processing time of the UE may be a same value as a PUSCH processing value of the UE.

DETAILED DESCRIPTION

Figure 1:
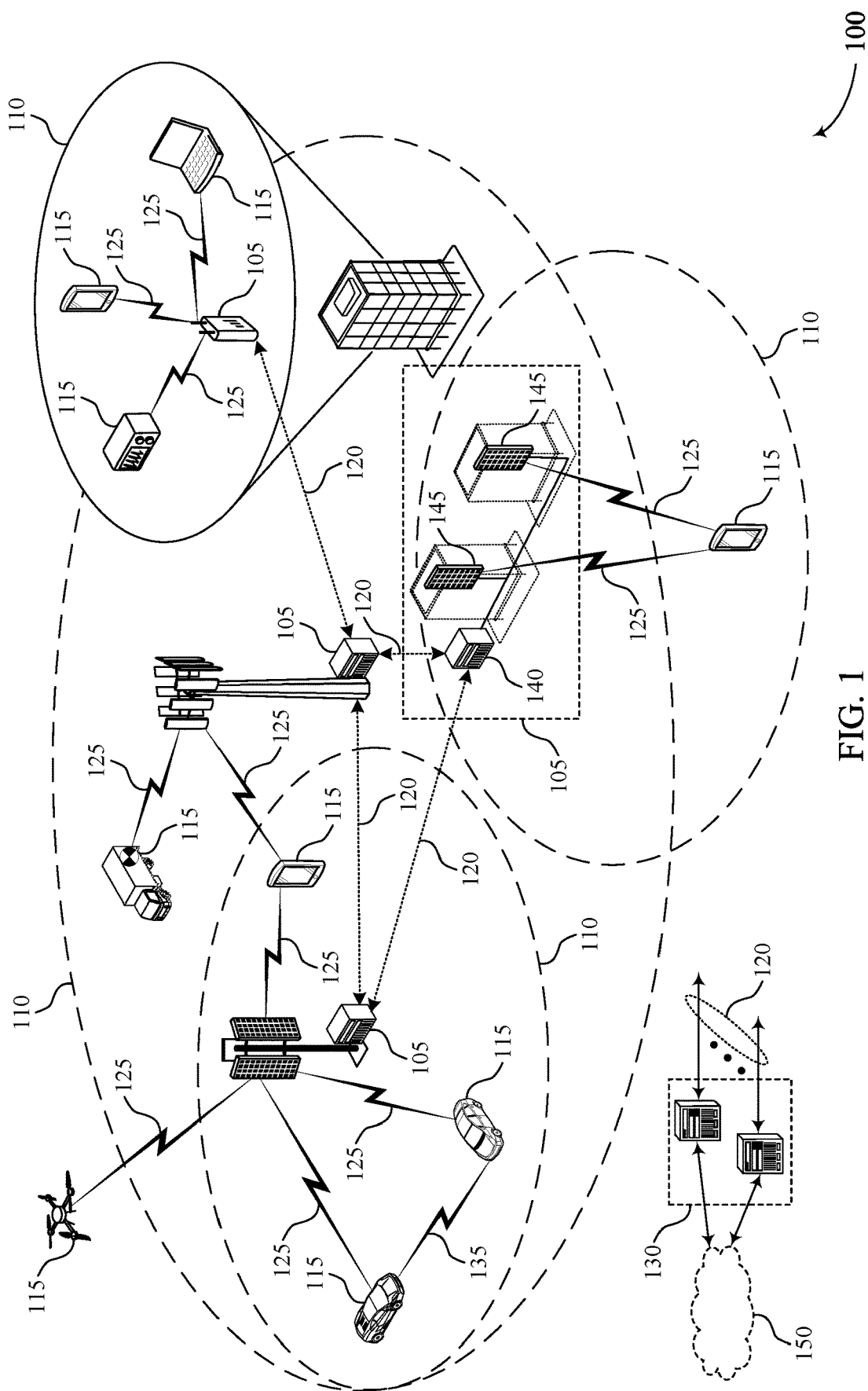
FIGS. 1 and 2 illustrate examples of wireless communications systems that support techniques for communicating hybrid automatic repeat request (HARQ) feedback in accordance with aspects of the present disclosure.

A wireless communications system may include communication devices, such as a UE or a base station (e.g., an eNodeB (eNB), a next-generation NodeB or a giga-NodeB, any of which may be referred to as a gNB, or some other base station), that may support multiple radio access technologies. Examples of radio access technologies include 4G systems, such as LTE systems, and 5G systems, which may be referred to as NR systems. In some wireless communications systems, a UE and a base station may be configured to communicate according to a semi-persistent scheduling (SPS) configuration. The SPS configuration may indicate a periodicity of SPS downlink occasions (e.g., a time between two SPS downlink occasions) and a physical uplink control channel (PUCCH) occasion scheduled to occur after a given SPS downlink occasion.

In some examples, a UE and a base station may also communicate according to a slot format in which some symbols are downlink symbols, some are uplink symbols, and some are flexible symbols (e.g., which may be scheduled as either downlink symbols or uplink symbols). In some cases, the slot format may change and alter which symbols are of a given type within the slot. As a result, a PUCCH occasion of the SPS configuration may occur within a downlink symbol of a slot having the changed slot format, thus colliding with the downlink symbol. In response, the UE may be configured to defer (e.g., delay) transmitting hybrid automatic repeat request (HARQ) feedback over the PUCCH occasion to a target transmission time interval (TTI), such as to a first (e.g., next) available PUCCH occasion after the collision.

A UE may be configured to report HARQ feedback according to various types of HARQ codebooks (e.g., a type 1 HARQ codebook, a type 2 HARQ codebook, a type 3 HARQ codebook, a dynamic grant HARQ codebook). For HARQ feedback communicated according to a type 3

HARQ codebook, a base station may transmit downlink control information (DCI) requesting the UE to transmit HARQ feedback associated with particular PUCCH occasions. In some examples, the base station may transmit the DCI such that the DCI is received at the UE at a time when the UE is deferring transmission of SPS-based HARQ feedback (e.g., received before the deferred SPS-based HARQ feedback is transmitted during the target TTI). In some cases, reception of the DCI may indicate for the UE to cancel transmission of the deferred SPS-based HARQ feedback. However, in some cases, timing and UE behavior ambiguities may arise, for example, if the UE has insufficient time to cancel the transmission of the deferred SPS-based HARQ feedback between reception of the DCI and the target TTI.

Techniques, systems, and devices are described herein for managing the communication of HARQ feedback in accordance with a minimum processing time of a UE. For example, the minimum processing time may be a duration that the UE takes to cancel a scheduled transmission of HARQ feedback in response to a request (e.g., indication) to cancel the scheduled transmission. Accordingly, if the UE receives the request with enough time to cancel the scheduled transmission based on the minimum processing time, the UE may cancel the scheduled transmission. Alternatively, the UE may proceed with the scheduled transmission.

For example, the UE may defer a first feedback message (e.g., SPS-based HARQ feedback) to a target TTI, where the first feedback message is in accordance with a first type of HARQ codebook (e.g., a type 1 HARQ codebook, a type 2 HARQ codebook). The UE may receive, from a base station, DCI during a reception time interval that triggers the UE to schedule a second feedback message that is in accordance with a second type HARQ codebook (e.g., a type 3 HARQ codebook, a dynamic grant HARQ codebook). In response to receiving the DCI, the UE may determine (e.g., evaluate) whether to cancel transmission of the first feedback message based on the minimum processing time of the UE. For example, the UE may compare the minimum processing time with a time difference between the reception time interval and the target TTI. If the time difference is greater than (e.g., or equal to) the minimum processing time, the UE may have sufficient time to cancel the transmission of the first feedback message and may thus cancel the transmission the first feedback message. Alternatively, if the time difference is less than (e.g., or equal to) the minimum processing time, the UE may have insufficient time to cancel the transmission of the first feedback message and may thus transmit the first feedback message during the target TTI.

Aspects of the subject matter described in this disclosure may be implemented to realize one or more of the following potential improvements, among others. The techniques employed by the described communication devices may enable the communication of HARQ feedback in accordance with a minimum processing time of a UE, which may remove UE behavior ambiguity associated with communicating the HARQ feedback. Additionally, communicating or canceling deferred HARQ feedback based on the minimum processing time of the UE may reduce power consumption, improve coordination between devices, and increase resource usage efficiency associated with communicating HARQ feedback. For example, a base station may consider the minimum processing time of the UE when requesting a type 3 HARQ codebook report and determine which HARQ processes (e.g., HARQ feedback corresponding to a given PUCCH occasion) are to be included in the report (e.g., whether to include a HARQ process corresponding to the deferred HARQ feedback in the report), thus avoiding repeated transmission of same HARQ feedback or transmission of unnecessary or less relevant HARQ feedback and avoiding a corresponding waste of resources. In some examples, communicating or canceling deferred HARQ feedback based on the minimum processing time of the UE may increase reliability, reduce latency, increase battery life, and increase spectral efficiency, among other benefits.

Aspects of the disclosure are initially described in the context of wireless communications systems. Aspects of the disclosure are additionally described in the context of a communication diagram and a process flow. Aspects of the disclosure are further illustrated by and described with reference to apparatus diagrams, system diagrams, and flowcharts that relate to techniques for communicating HARQ feedback.

FIG. 1 illustrates an example of a wireless communications system 100 that supports techniques for communicating HARQ feedback in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a TTI. In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 and a base station 105 may communicate HARQ feedback in accordance with various HARQ codebooks. For example, a UE 115 may be configured to report HARQ feedback using a type 1 HARQ codebook (e.g., a dynamic grant type 1 HARQ codebook), a type 2 HARQ codebook (e.g., a dynamic grant type 2 HARQ codebook, an enhanced type 2 HARQ codebook), or a type 3 HARQ codebook (e.g., an enhanced type 3 HARQ codebook). A HARQ codebook may be a sequence of HARQ feedback bits that is constructed using acknowledgement (ACK)

feedback, negative ACK (NACK) feedback, or both, corresponding to one or more downlink occasions (e.g., physical downlink shared channel (PDSCH) occasions) within a configured time window. Each HARQ codebook may indicate a quantity of HARQ feedback bits to include in a given HARQ feedback message and for which downlink occasions the UE 115 is to generate the HARQ feedback bits.

For example, a type 1 HARQ codebook may include HARQ feedback for each PDSCH occasion scheduled to occur within a time window indicated by DCI (e.g., indicated by a PDSCH-to-HARQ_feedback timing indicator field in the DCI), for instance, even if nothing is transmitted during a given PDSCH occasion. A type 1 codebook may have a fixed size that is indicated by a base station 105 via RRC signaling. In some examples, type 1 HARQ codebooks may be associated with increased reliability and robustness at the expense of increased signaling overhead relative to other types of HARQ codebooks.

A type 2 HARQ codebook may have a dynamic size that changes according to resource allocation. For example, when allocating PDSCH resources to a UE 115, DCI may include a downlink assignment index (DAI) that indicates which PDSCH transmissions are for a UE 115 within a configured time window. Accordingly, a type 2 HARQ codebook may include HARQ feedback for the PDSCH transmissions indicated by the DAI and exclude HARQ feedback for other PDSCH occasions within the configured time window. In some examples, type 2 HARQ codebooks may be associated with increased resource usage efficiency and reduced signaling overhead but reduced reliability compared to type 1 HARQ codebooks.

A type 3 HARQ codebook may include HARQ feedback for an indicated quantity of HARQ processes. In some examples, a type 3 HARQ codebook may include HARQ feedback for each configured HARQ process of each active component carrier within a configured time window. For example, if two component carriers are active and there are sixteen HARQ processes per component carrier, a UE 115 may include HARQ feedback for each of the thirty-two HARQ processes in a type 3 HARQ codebook. In some other examples, a base station 105 may configure a UE 115 with a set of type 3 HARQ codebook sizes via RRC signaling (e.g., a size 1, 2, 4, 8, etc.). Here, the size of a type 3 HARQ codebook may correspond to the quantity of HARQ processes for which HARQ feedback is to be included in the type 3 HARQ codebook. The base station 105 may transmit DCI to the UE 115 that requests a type 3 HARQ codebook and indicates a size of the type 3 HARQ codebook from the configured set of type 3 HARQ codebook sizes. The DCI may additionally indicate which HARQ processes are to be included in the type 3 HARQ codebook. For example, the DCI may indicate a type 3 HARQ codebook size of four and may indicate a starting HARQ process in time (e.g., via a HARQ-identifier (HARQ-ID) associated with the HARQ process). Accordingly here, the UE 115 may include HARQ feedback for the starting HARQ process and the next three HARQ processes in time in the type 3 HARQ codebook and may report the type 3 HARQ codebook to the base station 105.

In some examples, a dynamic grant HARQ codebook may be associated with a type 1 HARQ codebook or a type 2 HARQ codebook and may be communicated in response to a dynamic grant that scheduled a PDSCH transmission. For example, a base station 105 may transmit DCI (e.g., DCI 1_1, DCI 1_2) that schedules a PDSCH transmission. The HARQ feedback associated with the scheduled PDSCH may be included in a type 1 HARQ codebook or a type 2 HARQ codebook (e.g., as indicated by the DCI).

A UE 115 may be configured to defer transmission of HARQ feedback (e.g., of a HARQ codebook). For example, a UE 115 and a base station 105 may support communicating in accordance with an SPS scheme. The UE 115 and the base station 105 may also support communicating according to various slot formats that each indicate which symbols of a slot are downlink symbols, which symbols are uplink symbols, and which symbols are flexible symbols. In some examples, the slot format according to which the UE 115 and the base station 105 communicate may be indicated (e.g., configured) via RRC signaling. In some cases, the slot format may be updated while the SPS scheme remains the same, which may result in collisions between downlink symbols of the updated slot format and PUCCH occasions of the SPS scheme. As a result, the UE 115 may be configured to defer the transmission of HARQ feedback in a PUCCH occasion that collides with a downlink symbol to a target TTI (e.g., a first available PUCCH occasion in time after the collision).

In some examples, a UE 115 may support a joint (e.g., simultaneous) configuration of SPS-based HARQ deferral and type 3 HARQ codebook (e.g., or dynamic grant HARQ codebook) reporting. For example, the UE 115 may defer a first feedback message that is in accordance with a first type of HARQ codebook (e.g., a type 1 HARQ codebook, a type 2 HARQ codebook) to a target TTI. Between deferring the first feedback message and the target TTI, the UE 115 may receive, during a reception time interval, DCI from a base station 105 that requests for the UE 115 to transmit a second feedback message that is in accordance with a type 3 HARQ codebook. The type 3 HARQ codebook may include or exclude a HARQ process corresponding to the first feedback message and, in some examples, the reception of the DCI may indicate for the UE 115 to cancel transmission of the first feedback message during the target TTI.

To avoid timing and UE behavior ambiguities, a behavior of the UE 115 in response to receiving the DCI may be based on a minimum processing time of the UE 115 to react to the reception of the DCI and cancel the transmission of the first feedback message. For example, in response to receiving the DCI, the UE 115 may determine (e.g., evaluate) whether to cancel the transmission of the first feedback message based on the minimum processing time. For instance, the UE 115 may compare the minimum processing time with a time difference between the reception time interval during which the DCI is received and the target TTI. If the time difference is greater than the minimum processing time, the UE 115 may cancel the transmission of the first feedback message and transmit the second feedback message. Alternatively, if the time difference is less than the minimum processing time, the UE 115 may refrain from canceling the transmission of the first feedback message (e.g., due to having insufficient time to cancel the transmission of the first feedback message) and may transmit the first feedback message and the second feedback message.

Figure 2:
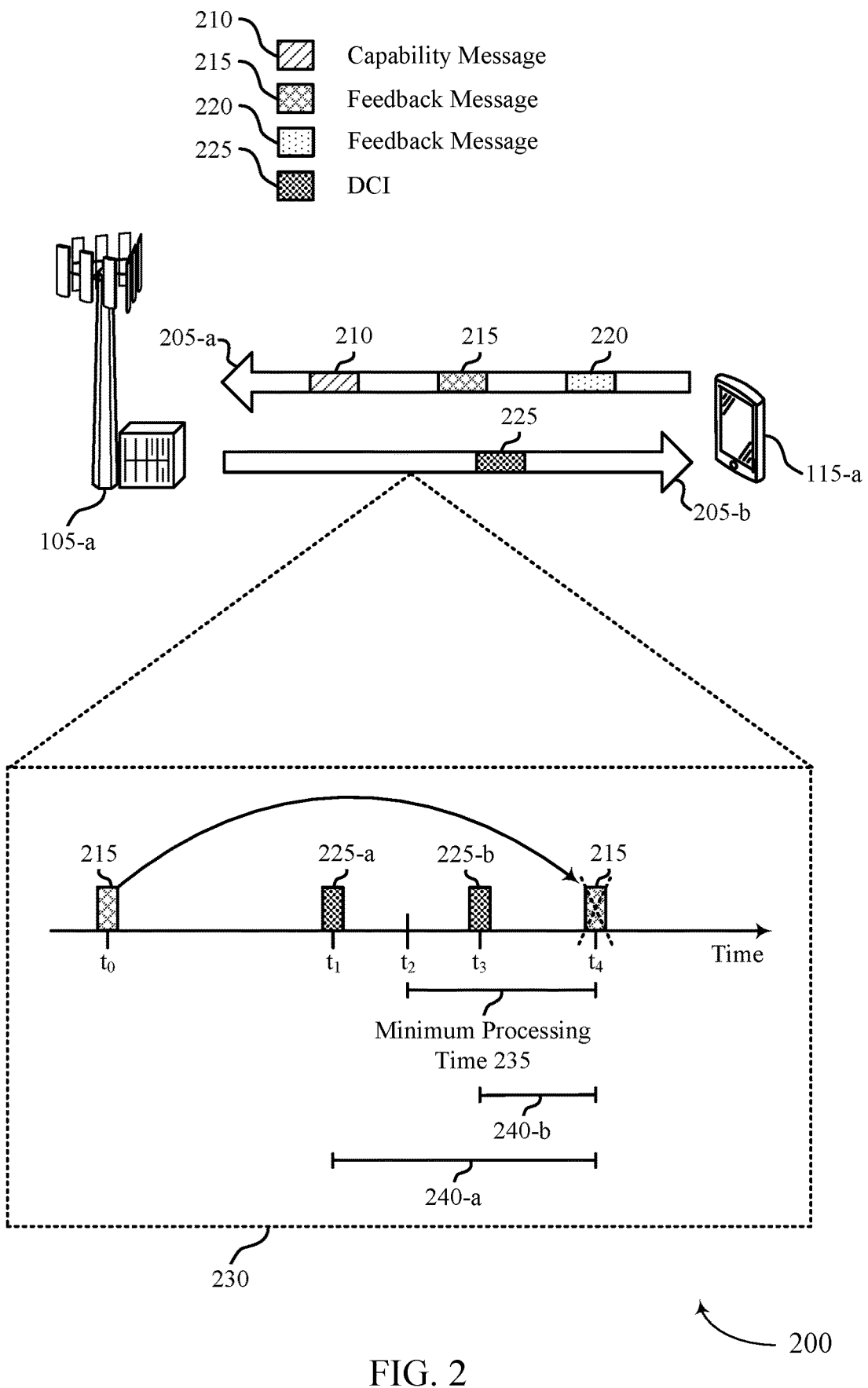

FIG. 2 illustrates an example of a wireless communications system 200 that supports techniques for communicating HARQ feedback in accordance with aspects of the present disclosure. The wireless communications system 200 may implement or be implemented by aspects of the wireless communications system 100 described with reference to FIG. 1. For example, the wireless communications system 200 may include a base station 105-*a* and a UE 115-*a*, which may be examples of the corresponding devices described with reference to FIG. 1. The wireless communications system 200 may support the management of HARQ feedback communication based on a UE minimum processing time, which may provide improvements to resource utilization efficiency, power consumption, resource scheduling, latency, spectral efficiency, battery life, coordination between devices, and processing capability, among other benefits.

The wireless communications system 200 may support communications between the base station 105-a and the UE 115-a. For example, the base station 105-a may transmit downlink messages to the UE 115-a over a communication link 205-a, and the UE 115-a may transmit uplink messages to the base station 105-a over communication link 205-b. The communication links 205 may be examples of a communication link 125 described with reference to FIG. 1.

The wireless communications system 200 may support the communication of HARQ feedback between the UE 115-a and the base station 105-a. The wireless communications system 200 may further support the management of HARQ feedback communication between the UE 115-a and the base station 105-a in accordance with a minimum processing time 235 of the UE 115-a. For example, the UE 115-a may have a minimum processing time 235 for canceling transmission of HARQ feedback in response to receiving an indication or request to cancel the HARQ feedback transmission. That is, upon reception of the indication to cancel the HARQ feedback transmission, the UE 115-a may be capable of canceling the HARQ feedback transmission after a duration of the minimum processing time 235 from the reception of the indication. In some examples, the minimum processing time 235 may relate specifically to a minimum processing time for the UE 115-a to cancel transmission of a deferred SPS-based HARQ transmission upon reception of a request for the UE 115-a to transmit a type 3 HARQ codebook. For example, the minimum processing time 235 may correspond to a time it takes for the UE 115-a to stop an SPS HARQ deferral procedure upon reception of a type 3 HARQ codebook request. In some examples, the duration of the minimum processing time 235 may correspond to a quantity of slots, a quantity of mini-slots, a quantity of symbols of a slot, or a combination thereof.

In some examples, the UE 115-a may transmit a capability message 210 (e.g., via RRC signaling) to the base station 105-a that indicates the minimum processing time 235 of the UE 115-a. In some cases, the capability message 210 may indicate the minimum processing time 235 as the time at (e.g., or after) which the UE 115-a may cancel the HARQ feedback transmission. In some cases, the capability message 210 may indicate the minimum processing time 235 as the time before which the UE 115-a may be unable to cancel the HARQ feedback transmission. In some examples, the capability message 210 may indicate whether the UE 115-a is capable of canceling the HARQ feedback transmission.

The base station 105-a and the UE 115-a may communicate feedback messages based on the minimum processing time 235. For example, the base station 105-a and the UE 115-a may communicate feedback messages according to a communication sequence 230. The communication sequence 230 depicts that at a time to, the UE 115-a may defer transmission of a feedback message 215 to a target TTI corresponding to a time $t_4$. For example, the feedback message 215 may be an SPS-based HARQ feedback message that the UE 115-a defers to the target TTI as a result of a collision between a scheduled transmission of the feedback message 215 (e.g., at to) and a downlink symbol (e.g., or a downlink slot) of a TDD scheme according to which the UE 115-a and the base station 105-a communicate. Additionally, the base station 105-a may identify the collision and determine that the UE 115-a is configured to defer the feedback message 215 to the target TTI (e.g., to $t_4$). In some examples, the feedback message 215 may be in accordance with a first type of HARQ codebook, such as a type 1 HARQ codebook or a type 2 HARQ codebook.

Between to and $t_4$, the base station 105-a may transmit DCI 225 to the UE 115-a that triggers the UE 115-a to schedule a feedback message 220 that is in accordance with a second type of HARQ codebook, such as a type 3 HARQ codebook or a dynamic grant HARQ codebook. For example, the DCI 225 may request for the UE 115-a to transmit a type 3 HARQ codebook to the base station 105-a. Alternatively, the DCI 225 may include a dynamic grant for a PDSCH transmission, and the UE 115-a may be configured to transmit a dynamic grant HARQ codebook corresponding to the PDSCH transmission in response to receiving the DCI 225. The UE 115-a may receive the DCI 225 during a reception time interval and may determine its behavior regarding the feedback message 215 based on the when the DCI 225 is received relative to the minimum processing time 235. For example, the communication sequence 230 depicts an example in which the base station 105-a transmits DCI 225-a during a reception time interval corresponding to a time $t_1$. The minimum processing time 235 may correspond to a time $t_2$ before the target TTI at $t_4$. That is, if the UE 115-a receives DCI 225 before (e.g., or at) $t_2$, the UE 115-a may cancel the transmission of the feedback message 215 at $t_4$. Alternatively, if the UE 115-a receives DCI 225 after (e.g., or at) $t_2$, the UE 115-a may be unable to cancel the transmission of the feedback message 215 at $t_4$.

Accordingly, if the UE 115-a receives the DCI 225-a at $t_1$, which is before $t_2$, the UE 115-a may be configured to cancel the transmission of the feedback message 215 at $t_4$ (e.g., stop the SPS HARQ deferral procedure of the feedback message 215). For example, in response to receiving the DCI 225-a, the UE 115-a may evaluate whether to cancel the transmission of the feedback message 215. The UE 115-a may compare the minimum processing time 235 with a time difference 240-a between the reception time interval of the DCI 225-a and the target TTI of the feedback message 215 (e.g., between $t_1$ and $t_4$). Based on the comparison, the UE 115-a may determine that the time difference 240-a is greater than the minimum processing time 235. The UE 115-a may therefore determine that there is sufficient time to cancel the transmission of the feedback message 215 and may cancel the transmission of the feedback message 215. Additionally, the base station 105-a may compare the minimum processing time 235 with the time difference 240-a and determine that the UE 115-a is to cancel the transmission of the feedback message 215 based on the comparison.

The communication sequence 230 also depicts an example in which the base station 105-a transmits DCI 225-b during a reception time interval corresponding to a time $t_3$, which is after $t_2$. Here, the UE 115-a may be configured to refrain from canceling the transmission of the feedback message 215 at $t_4$ (e.g., continue with the SPS HARQ deferral procedure of the feedback message 215) based on receiving the DCI 225-b after $t_2$. For example, in response to receiving the DCI 225-b, the UE 115-a may evaluate whether to cancel the transmission of the feedback message 215. The UE 115-a may compare the minimum processing time 235 with a time difference 240-b between the reception time interval of the DCI 225-b and the target TTI of the feedback message 215 (e.g., between $t_3$ and $t_4$). Based on the comparison, the UE 115-a may determine that the time difference 240-*b* is less than the minimum processing time 235. The UE 115-*a* may therefore determine that there is insufficient time to cancel the transmission of the feedback message 215 and may proceed to transmit the feedback message 215 during the target TTI (e.g., at t₄). Additionally, the base station 105-*a* may compare the minimum processing time 235 with the time difference 240-*b* and determine that the UE 115-*a* is to transmit the feedback message 215 during the target TTI based on the comparison.

The UE 115-*a* may transmit the feedback message 220 based on the DCI 225 and in accordance with the evaluation of whether to cancel the transmission of the feedback message 215. For example, the DCI 225 may indicate a set of HARQ processes that the UE 115-*a* is to include in the feedback message 220 (e.g., in accordance with the type 3 HARQ codebook). In some examples, the DCI 225 may request for the UE 115-*a* to include a HARQ process associated with the feedback message 215 in the set of HARQ processes (e.g., the feedback message 220 may include the contents of the feedback message 215). In some examples, the HARQ process associated with the feedback message 215 may be excluded from the set of HARQ processes. Additional details related to the transmission of the feedback message 220 based on the DCI 225 and the communication or cancellation of the feedback message 215 are described with reference to FIG. 3 below.

Thus, the UE 115-*a* may transmit one or both of the feedback message 215 and the feedback message 220 to the base station 105-*a* based on the minimum processing time 235 and the time at which the UE 115-*a* receives the DCI 225. In this way, any ambiguities related to the transmission of the feedback message 215 and the feedback message 220 may be removed and coordination between the UE 115-*a* and the base station 105-*a* may be improved, among other benefits.

Figure 3:
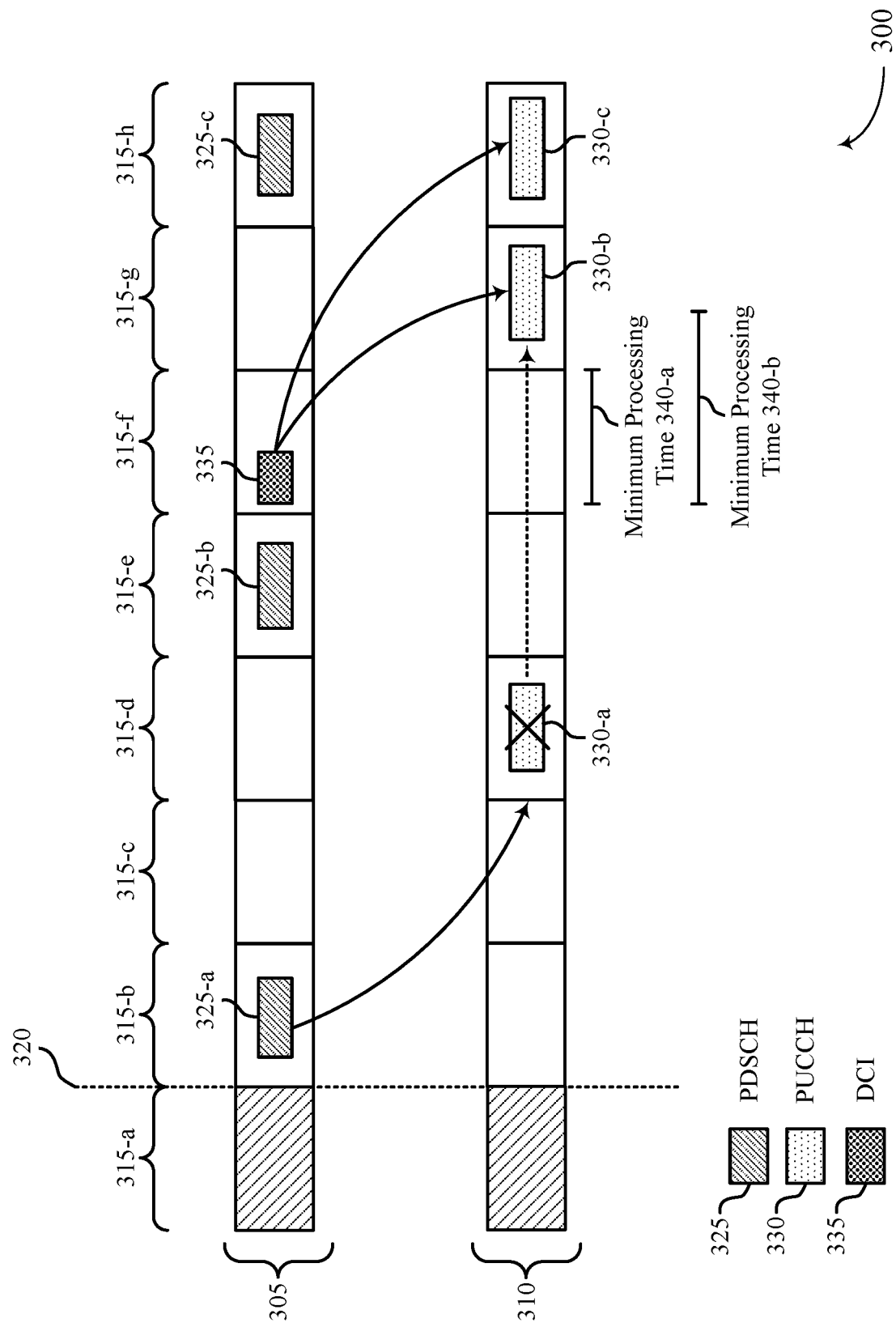
FIG. 3 illustrates an example of a communication diagram that supports techniques for communicating HARQ feedback in accordance with aspects of the present disclosure.

FIG. 3 illustrates an example of a communication diagram 300 that supports techniques for communicating HARQ feedback in accordance with aspects of the present disclosure. The communication diagram 300 may implement or be implemented by aspects of the wireless communications systems 100 and 200 as described with reference to FIGS. 1 and 2, respectively. For example, the communication diagram 300 may be implemented by a UE 115 and a base station 105 to support HARQ feedback communication in accordance with a minimum processing time of the UE 115.

The communication diagram 300 depicts a series of communications between the UE 115 and the base station 105 separated into downlink communications 305 and uplink communications 310. The communications occur over a set of slots 315, which in the example of FIG. 3, includes a slot 315-*a*, a slot 315-*b*, a slot 315-*c*, a slot 315-*d*, a slot 315-*e*, a slot 315-*f*, a slot 315-*g*, and a slot 315-*h* (although any quantity of slots 315 is possible). The slots 315 may have a slot format that indicates which symbols of a given slot 315 are downlink symbols, which symbols of the given slot 315 are uplink symbols, and which symbols of the given slot 315 are flexible symbols (e.g., which may be scheduled as either downlink symbols or uplink symbols). In the example of FIG. 3, the slot 315-*a* may have a first slot format, and the slots 315-*b* through 315-*h* may have a second slot format. A slot format change 320 may occur after the slot 315-*a* (e.g., in accordance with an RRC configuration) that changes the slot format of the communications between the UE 115 and the base station 105 from the first slot format to the second slot format.

The slot format change 320 may result in collisions between downlink symbols of a slot 315 having the second format and an SPS configuration according to which the UE 115 and the base station 105 communicate. For example, the SPS configuration may indicate a periodicity of a PDSCH 325 (e.g., a time between two PDSCHs 325) and a PUCCH 330 scheduled to occur after a given PDSCH 325. For instance, if the SPS configuration indicates that a PDSCH 325 occurs every three slots 315 and a PDSCH 325-*a* occurs in the slot 315-*b*, a PDSCH 325-*b* may occur in the slot 315-*e* and a PDSCH 325-*c* may occur in the slot 315-*h*. Additionally, if the SPS configuration indicates that a PUCCH 330 occurs two slots 315 after a PDSCH 325, a PUCCH 330-*a* may occur in the slot 315-*d* and a PUCCH 330-*b* may occur in the slot 315-*g*. In some cases, however, a PUCCH 330 indicated by the SPS configuration may collide with a downlink symbol of a slot 315 having the second format. For example, the PUCCH 330-*a* may occur during one or more downlink symbols of the slot 315-*d*, and thus the UE 115 may be unable to transmit uplink transmissions over the PUCCH 330-*a*. For example, the UE 115 may be unable to transmit HARQ feedback corresponding to PDSCH 325-*a* over the PUCCH 330-*a*.

Based on the collision, the UE 115 may be configured to defer transmission of the SPS-based HARQ feedback scheduled for the PUCCH 330-*a* to a target TTI, where the SPS-based HARQ feedback may be an example of a feedback message 215 described with reference to FIG. 2. In some examples, the target TTI may correspond to a first available PUCCH 330 after the PUCCH 330-*a*, which, in the example of FIG. 3, may correspond to the PUCCH 330-*b*.

Between the PUCCH 330-*a* and the PUCCH 330-*b*, the base station 105 may transmit DCI 335 that requests for the UE 115 to transmit a type 3 HARQ codebook to the base station 105, which may be an example of a feedback message 220 described with reference to FIG. 2. For example, the UE 115 may receive the DCI 335 during a reception time interval within the slot 315-*f*. The UE 115 (e.g., or the DCI 335) may schedule transmission of the type 3 HARQ codebook during a TTI subsequent to the DCI 335. In some examples, the scheduled TTI may overlap with the target TTI. For example, the scheduled TTI may occur during an overlapping portion of the PUCCH 330-*b*. In some examples, the scheduled TTI may be the target TTI (e.g., may be the PUCCH 330-*b*). In some examples, the scheduled TTI may occur after the target TTI, such as occurring during a PUCCH 330-*c* in the slot 315-*h*.

In response to receiving the DCI 335, the UE 115 may be configured to evaluate whether to cancel the transmission of the SPS-based HARQ feedback over the PUCCH 330-*b* based on a minimum processing time 340 of the UE 115, which may be an example of the minimum processing time 235 described with reference to FIG. 2. For example, if the UE 115 has a minimum processing time 340-*a*, the UE 115 may determine that there is sufficient time for the UE 115 to cancel the transmission of the SPS-based HARQ feedback and may cancel the transmission of the SPS-based HARQ feedback. If the UE 115 has a minimum processing time 340-*b*, the UE 115 may determine that there is insufficient time for the UE 115 to cancel the transmission of the SPS-based HARQ feedback over the PUCCH 330-*b* and may proceed to transmit the SPS-based HARQ feedback over the PUCCH 330-*b*.

In some examples, the minimum processing time 340 of the UE 115 may be a same value as a physical uplink shared channel (PUSCH) processing value of the UE 115. For example, a PUSCH processing value (e.g., a PUSCH preparation time between receiving a PUSCH allocation and PUSCH transmission over the allocated PUSCH) may be determined for the UE 115. In some examples, the UE 115 may calculate the minimum processing time 340 and may report the minimum processing time 340 to the base station 105.

The UE 115 may transmit the type 3 HARQ codebook during the scheduled TTI. In some examples, the UE 115 may transmit the type 3 HARQ codebook over at least a portion of the PUCCH 330-b. For example, if the UE 115 cancels the transmission of the SPS-based HARQ feedback and the scheduled TTI occurs during the PUCCH 330-b, the UE 115 may transmit the type 3 HARQ codebook over at least the portion of the PUCCH 330-b. In some examples, the type 3 HARQ codebook may be scheduled to be transmitted after the SPS-based HARQ feedback based on the minimum processing time 340. For example, if the DCI 335 is received with insufficient time to cancel the SPS-based HARQ feedback, the type 3 HARQ codebook may be scheduled for the PUCCH 330-c to avoid a scheduling conflict between the SPS-based HARQ feedback and the type 3 HARQ codebook. In some examples, the type 3 HARQ codebook may be scheduled for the PUCCH 330-c and the UE 115 may receive the DCI 335 with sufficient time to cancel the transmission of the SPS-based HARQ feedback.

In some examples, the base station 105 may consider the minimum processing time 340 of the UE 115 when transmitting the DCI 335 and determining which HARQ processes are to be included in the type 3 HARQ codebook. For example, if the base station 105 wants the UE 115 to cancel the transmission of the SPS-based HARQ feedback and wants the UE 115 to include a HARQ process corresponding to the SPS-based HARQ feedback in the type 3 HARQ codebook, the base station 105 may transmit the DCI 335 such that a time difference between reception of the DCI 335 and the target TTI (e.g., the PUCCH 330-b) is greater than the minimum processing time 340. Additionally or alternatively, if the base station 105 wants the UE 115 to proceed with the transmission of the SPS-based HARQ feedback and wants the UE 115 to exclude a HARQ process corresponding to the SPS-based HARQ feedback from the type 3 HARQ codebook, the base station 105 may transmit the DCI 335 such that a time difference between reception of the DCI 335 and the target TTI is less than the minimum processing time 340.

In some examples, the DCI 335 may include a dynamic grant that schedules a PDSCH 325 (not shown) and indicates a PUCCH 330 over which the UE 115 is to transmit HARQ feedback corresponding to the PDSCH 325 (e.g., in accordance with a type 1 dynamic grant HARQ codebook or a type 2 dynamic grant HARQ codebook). In some cases, the DCI 335 may indicate that the UE 115 is to transmit the HARQ feedback over the PUCCH 330-b, for example, based on a PDSCH-to-HARQ feedback timing. In some examples, the UE 115 may multiplex the HARQ feedback corresponding to the dynamic grant PDSCH 325 with the SPS-based HARQ feedback and may transmit the multiplexed HARQ feedback to the base station 105. In some examples, the PUCCH 330-b may be insufficient to carry the multiplexed HARQ feedback. Here, the UE 115 may cancel transmission of the SPS-based HARQ feedback (e.g., in accordance with the minimum processing time 340-a) and may transmit the HARQ feedback corresponding to the dynamic grant PDSCH 325 over the PUCCH 330-b.

Figure 4:
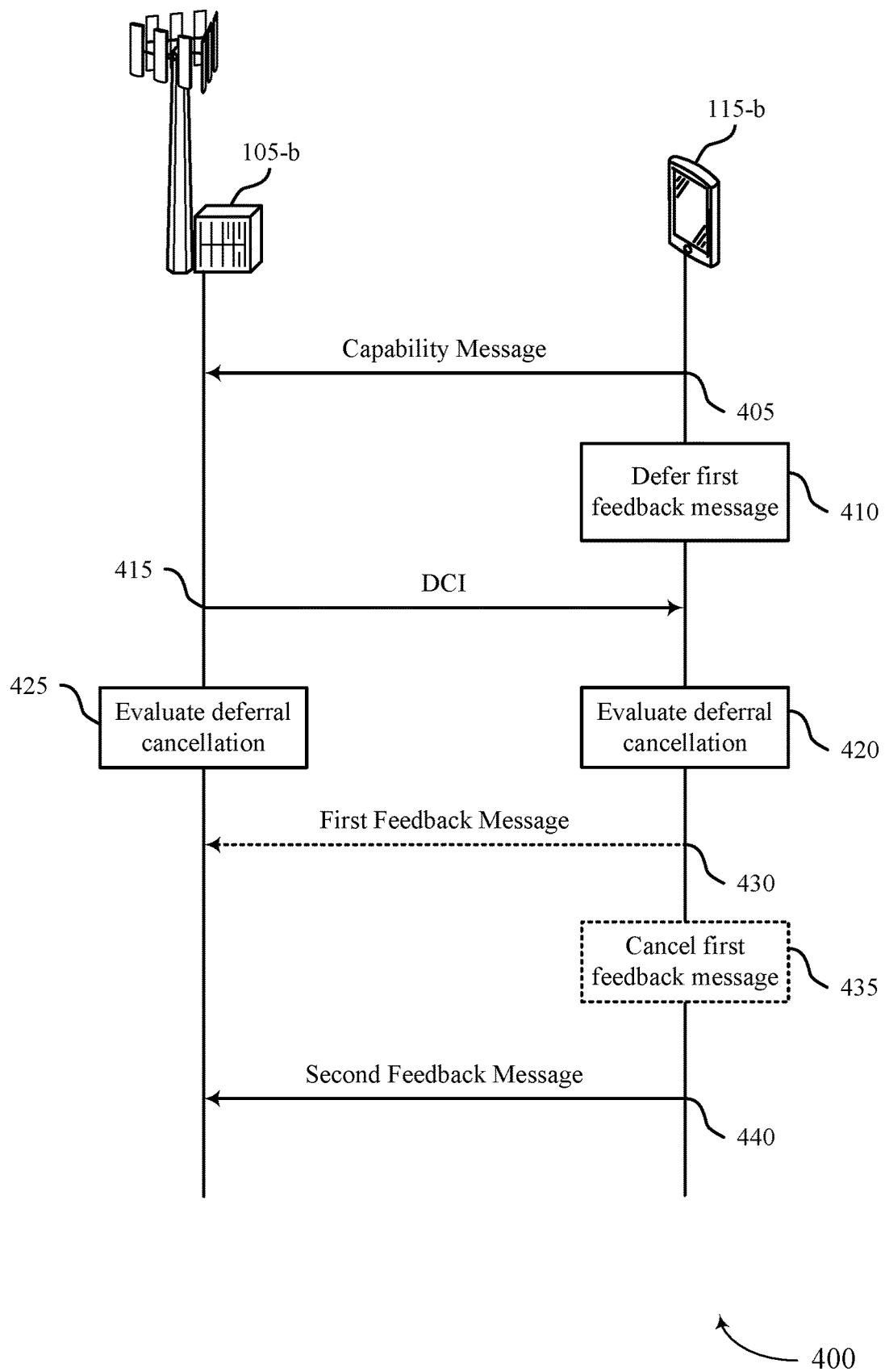
FIG. 4 illustrates an example of a process flow that supports techniques for communicating HARQ feedback in accordance with aspects of the present disclosure.

FIG. 4 illustrates an example of a process flow 400 that supports techniques for communicating HARQ feedback in accordance with aspects of the present disclosure. In some examples, the process flow 400 may implement or be implemented by aspects of a wireless communications system 100 and 200 as described with reference to FIGS. 1 and 2. For example, the process flow 400 may be implemented by a base station 105-b and a UE 115-b to support the HARQ feedback communication in accordance with a minimum processing time of the UE 115-b.

The base station 105-b and the UE 115-b may be examples of a base station 105 or a UE 115, as described with reference to FIGS. 1 through 3. In the following description of the process flow 400, the operations between the base station 105-b and the UE 115-b may be communicated in a different order than the example order shown, or the operations performed by the base station 105-b and the UE 115-b may be performed in different orders or at different times. Some operations may also be omitted from the process flow 400, and other operations may be added to the process flow 400. Further, although some operations or signaling may be shown to occur at different times for discussion purposes, these operations may actually occur at the same time.

At 405, the UE 115-b may transmit a capability message to the base station 105-b that indicates a minimum processing time of the UE 115-b. The minimum processing time of the UE 115-b may be a time it takes for the UE 115-b to cancel transmission of a feedback message in response to receiving an indication (e.g., a request) for the UE 115-b to cancel the transmission of the feedback message. In some examples, the UE 115-b may transmit the capability message via RRC signaling.

At 410, the UE 115-b may defer transmission of a first feedback message to a target TTI. For example, the first feedback message may be an SPS-based feedback message and may be deferred based on a collision between a downlink symbol (e.g., or a downlink slot) and an SPS configuration according to which the UE 115-b and the base station 105-b communicate. The first feedback message may be in accordance with a first type of HARQ codebook, such as a type 1 HARQ codebook or a type 2 HARQ codebook. For example, the first feedback message may include HARQ feedback included in a type 1 HARQ codebook or a type 2 HARQ codebook. Additionally, the base station 105-b may determine that the UE 115-b is to defer the transmission of the first feedback message to the target TTI based on the collision.

At 415, the base station 105-b may transmit DCI to the UE 115-b that triggers the UE 115-b to schedule a second feedback message that is in accordance with a second type of HARQ codebook, such as a type 3 HARQ codebook. For example, the DCI may request for the UE 115-b to transmit a type 3 HARQ codebook in the second feedback message. The UE 115-b may receive the DCI in a reception time interval that is before the target TTI in time (e.g., and after the collision). In some examples, the type 3 HARQ codebook may include a HARQ process corresponding to the first feedback message. In some other examples, the type 3 HARQ codebook may exclude the HARQ process corresponding to the first feedback message. That is, the second feedback message include or exclude HARQ feedback included in the first feedback message based on the type 3 HARQ codebook requested by the DCI.

At 420, the UE 115-b may evaluate whether to cancel the transmission of the first feedback message during the target TTI. For example, the UE 115-b may compare the minimum processing time of the UE 115-b with a time difference between the reception time interval and the target TTI. If the time difference is less than the minimum processing time of the UE 115-b, the UE 115-b may be incapable of canceling (e.g., may have insufficient time to cancel) the transmission of the first feedback message. Alternatively, if the time difference is greater than the minimum processing time of the UE 115-*b*, the UE 115-*b* may be capable of canceling (e.g., may have sufficient time to cancel) the transmission of the first feedback message. Accordingly, the UE 115-*b* may evaluate whether to cancel the transmission of the first feedback message based on the comparison between the time difference and the minimum processing time of the UE 115-*b*.

At 425, the base station 105-*b* may evaluate whether the UE 115-*b* is to cancel the transmission of the first feedback message during the target TTI. For example, the base station 105-*b* may compare the minimum processing time of the UE 115-*b* with the time difference to determine whether the UE 115-*b* is capable of canceling the transmission of the first feedback message.

If the UE 115-*b* determines not to cancel the transmission of the first feedback message, at 430, the UE 115-*b* may transmit the first feedback message during the target TTI. For example, if the UE 115-*b* evaluates that the time difference is less than the minimum processing time of the UE 115-*b* based on the comparison, the UE 115-*b* may transmit the first feedback message during the target TTI.

If the UE 115-*b* determines to cancel the transmission of the first feedback message, at 435, the UE 115-*b* may cancel the transmission of the first feedback message during the target TTI. For example, if the UE 115-*b* evaluates that the time difference is greater than the minimum processing time of the UE 115-*b* based on the comparison, the UE 115-*b* may cancel the transmission of the first feedback message during the target TTI.

At 440, the UE 115-*b* may transmit the second feedback message in accordance with the type 3 HARQ codebook. In some examples of the UE 115-*b* transmitting the first feedback message, the UE 115-*b* may transmit the second feedback message during a second TTI after the target TTI. For example, the DCI may request that the type 3 HARQ codebook include the HARQ process associated with the first feedback message. In some examples of the UE 115-*b* canceling the transmission of the first feedback message, the UE 115-*b* may include the first feedback message in the second feedback message (e.g., include the HARQ feedback of the first feedback message in the second feedback message). In some cases, the UE 115-*b* may include the first feedback message in the second feedback message by multiplexing the first feedback message and the second feedback message. In some cases, the UE 115-*b* may include the first feedback message in the second feedback message by concatenating the first feedback message and the second feedback message or otherwise embedding the first feedback message within the second feedback message. In some examples of the UE 115-*b* canceling the transmission of the first feedback message, the UE 115-*b* may transmit the second feedback message during a scheduled TTI that overlaps with the target TTI (e.g., or is the target TTI). In some examples of the UE 115-*b* canceling the transmission of the first feedback message, the UE 115-*b* may transmit the second feedback message during the second TTI after the target TTI.

Figure 5:
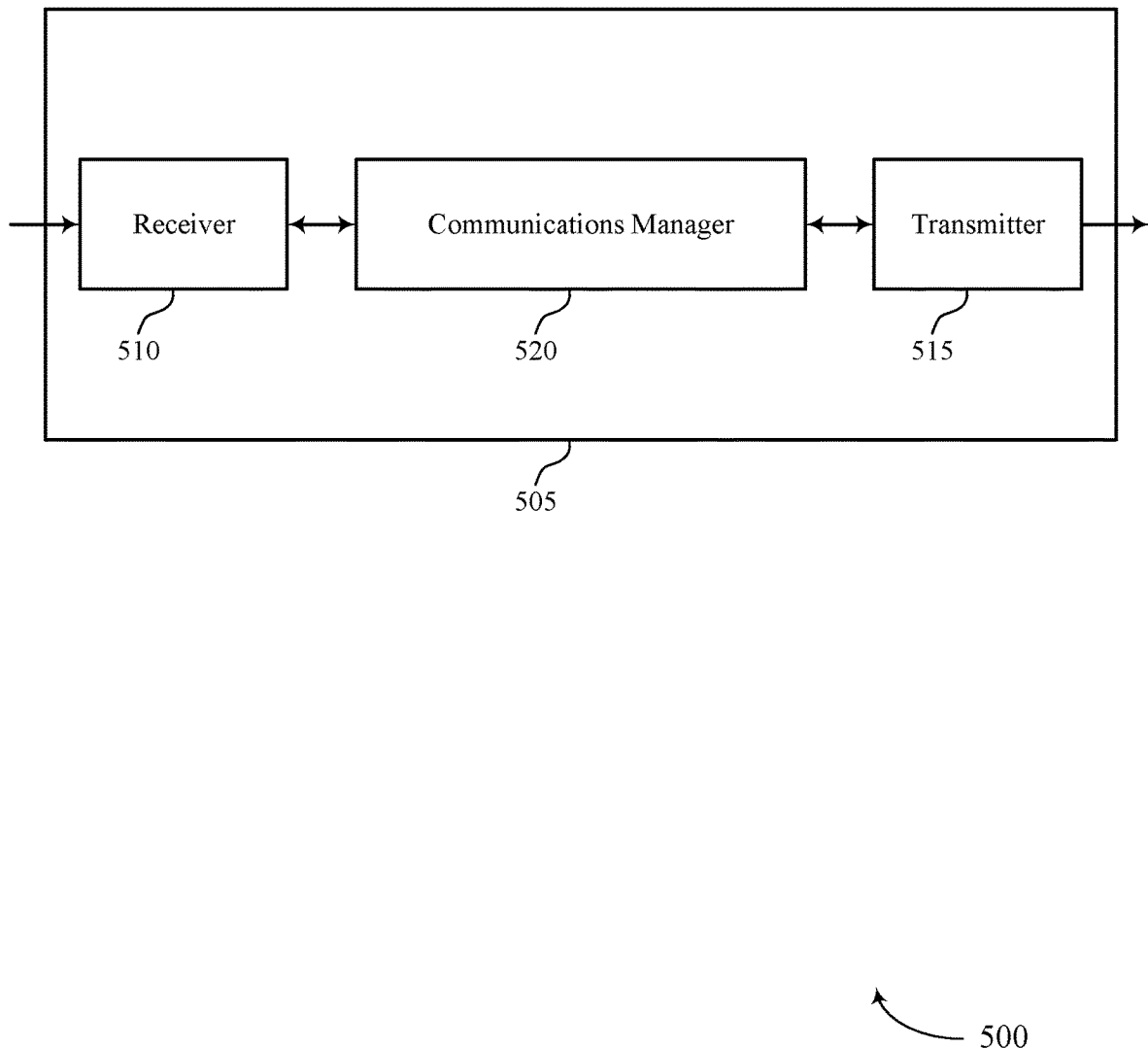
FIGS. 5 and 6 show block diagrams of devices that support techniques for communicating HARQ feedback in accordance with aspects of the present disclosure.

FIG. 5 shows a block diagram 500 of a device 505 that supports techniques for communicating HARQ feedback in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for communicating HARQ feedback). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for communicating HARQ feedback). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for communicating HARQ feedback as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for deferring, to a target TTI, transmission of a first feedback message that is in accordance with a first type of HARQ codebook. The communications manager 520 may be configured as or otherwise support a means for receiving, from a base station and during a reception time interval, DCI that triggers the UE to schedule a second feedback message that is in accordance with a second type of HARQ codebook that is different from the first type of HARQ codebook. The communications manager 520 may be configured as or otherwise support a means for determining whether to cancel transmission of the first feedback message during the target TTI based on a minimum processing time of the UE and a time difference between the reception time interval and the target TTI. The communications manager 520 may be configured as or otherwise support a means for transmitting at least one of the first feedback message or the second feedback message in accordance with the determining.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, and more efficient utilization of communication resources by supporting the communication or cancellation of HARQ feedback based on a minimum processing time of a UE.

Figure 6:
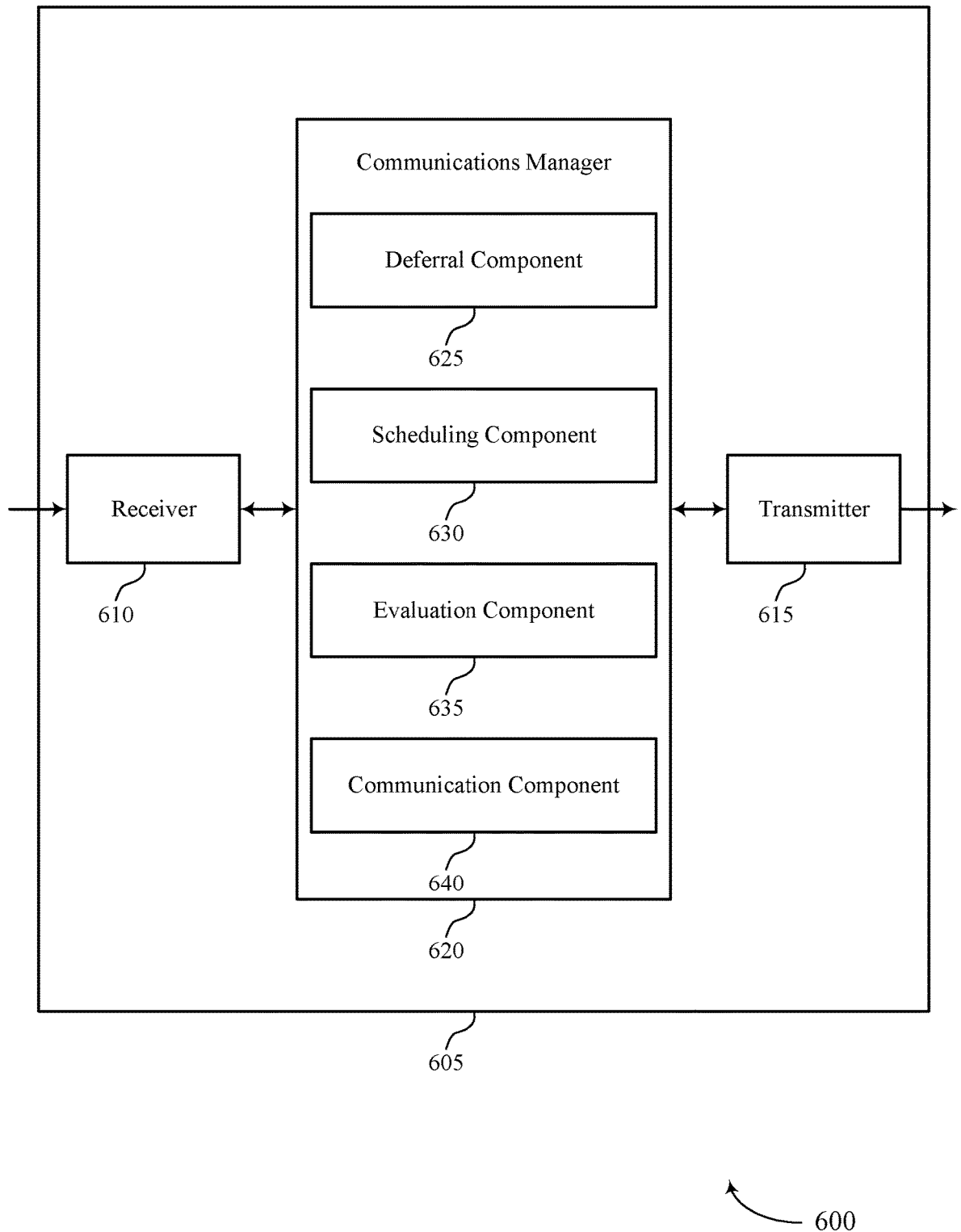

FIG. 6 shows a block diagram 600 of a device 605 that supports techniques for communicating HARQ feedback in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for communicating HARQ feedback). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for communicating HARQ feedback). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for communicating HARQ feedback as described herein. For example, the communications manager 620 may include a deferral component 625, a scheduling component 630, an evaluation component 635, a communication component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The deferral component 625 may be configured as or otherwise support a means for deferring, to a target TTI, transmission of a first feedback message that is in accordance with a first type of HARQ codebook. The scheduling component 630 may be configured as or otherwise support a means for receiving, from a base station and during a reception time interval, DCI that triggers the UE to schedule a second feedback message that is in accordance with a second type of HARQ codebook that is different from the first type of HARQ codebook. The evaluation component 635 may be configured as or otherwise support a means for determining whether to cancel transmission of the first feedback message during the target TTI based on a minimum processing time of the UE and a time difference between the reception time interval and the target TTI. The communication component 640 may be configured as or otherwise support a means for transmitting at least one of the first feedback message or the second feedback message in accordance with the determining.

Figure 7:
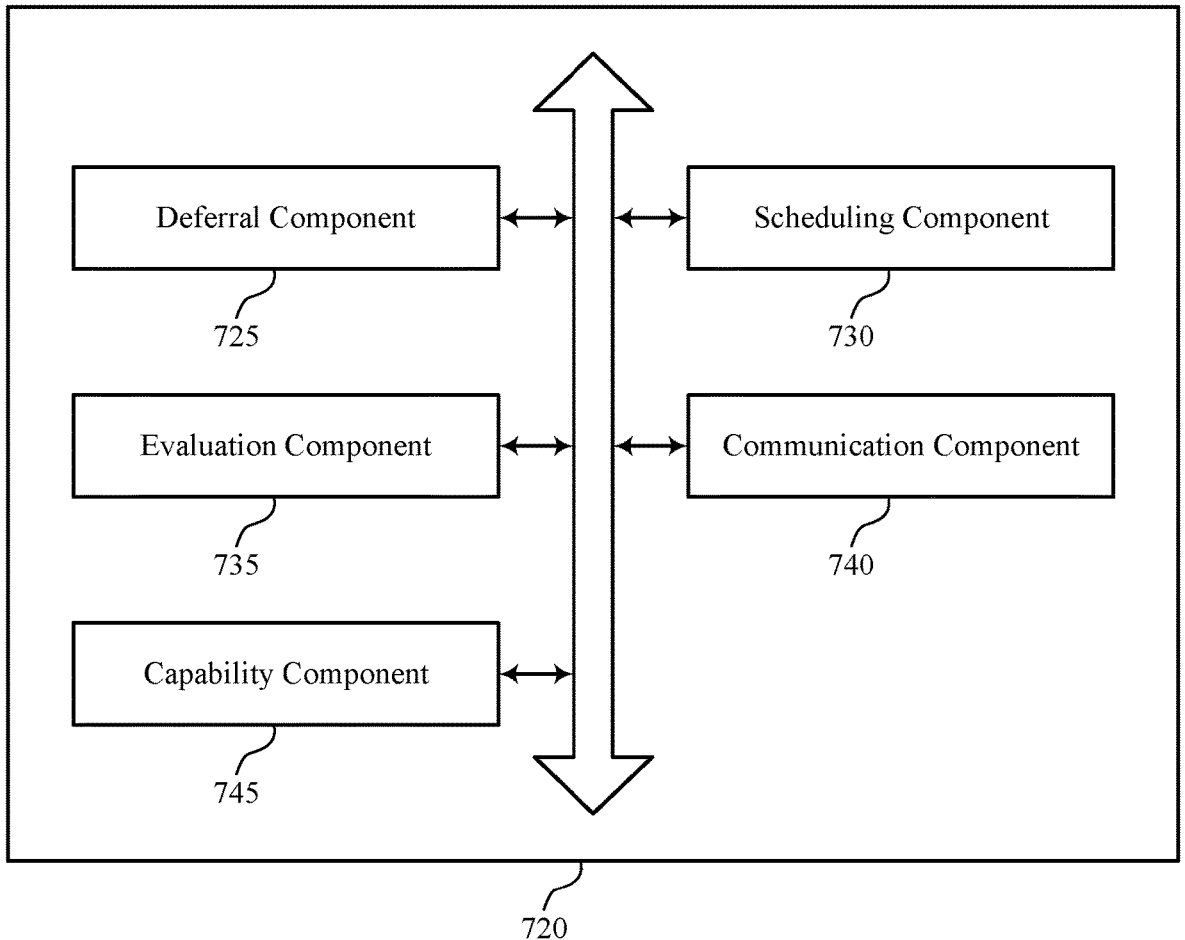
FIG. 7 shows a block diagram of a communications manager that supports techniques for communicating HARQ feedback in accordance with aspects of the present disclosure.

FIG. 7 shows a block diagram 700 of a communications manager 720 that supports techniques for communicating HARQ feedback in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for communicating HARQ feedback as described herein. For example, the communications manager 720 may include a deferral component 725, a scheduling component 730, an evaluation component 735, a communication component 740, a capability component 745, or any combination thereof. Each of these components may communicate, directly or indirectly, with one another (e.g., via one or more buses).

The communications manager 720 may support wireless communication at a UE in accordance with examples as disclosed herein. The deferral component 725 may be configured as or otherwise support a means for deferring, to a target TTI, transmission of a first feedback message that is in accordance with a first type of HARQ codebook. The scheduling component 730 may be configured as or otherwise support a means for receiving, from a base station and during a reception time interval, DCI that triggers the UE to schedule a second feedback message that is in accordance with a second type of HARQ codebook that is different from the first type of HARQ codebook. The evaluation component 735 may be configured as or otherwise support a means for determining whether to cancel transmission of the first feedback message during the target TTI based on a minimum processing time of the UE and a time difference between the reception time interval and the target TTI. The communication component 740 may be configured as or otherwise support a means for transmitting at least one of the first feedback message or the second feedback message in accordance with the determining.

In some examples, the capability component 745 may be configured as or otherwise support a means for transmitting, to the base station and before deferring the transmission of the first feedback message, a capability message that indicates the minimum processing time of the UE.

In some examples, the evaluation component 735 may be configured as or otherwise support a means for canceling transmission of the first feedback message during the target TTI based on the time difference between the reception time interval and the target TTI being greater than the minimum processing time.

In some examples, the second feedback message is transmitted during a scheduled TTI that overlaps with the target TTI based on canceling transmission of the first feedback message.

In some examples, the DCI requests for the UE to include feedback for the first feedback message in the second feedback message based on the time difference between the reception time interval and the target TTI being greater than the minimum processing time.

In some examples, to support transmitting at least one of the first feedback message or the second feedback message, the communication component 740 may be configured as or otherwise support a means for transmitting the first feedback message during the target TTI based on the time difference between the reception time interval and the target TTI being less than the minimum processing time. In some examples, to support transmitting at least one of the first feedback message or the second feedback message, the communication component 740 may be configured as or otherwise support a means for transmitting the second feedback message during a second TTI after the target TTI.

In some examples, the first feedback message is associated with an SPS configuration according to which the UE and the base station communicate.

In some examples, the first type of HARQ codebook is a type 1 HARQ codebook or a type 2 HARQ codebook. In some examples, the second type of HARQ codebook is a type 3 HARQ codebook or a dynamic grant HARQ codebook.

In some examples, the minimum processing time of the UE is a same value as a PUSCH processing value of the UE.

Figure 8:
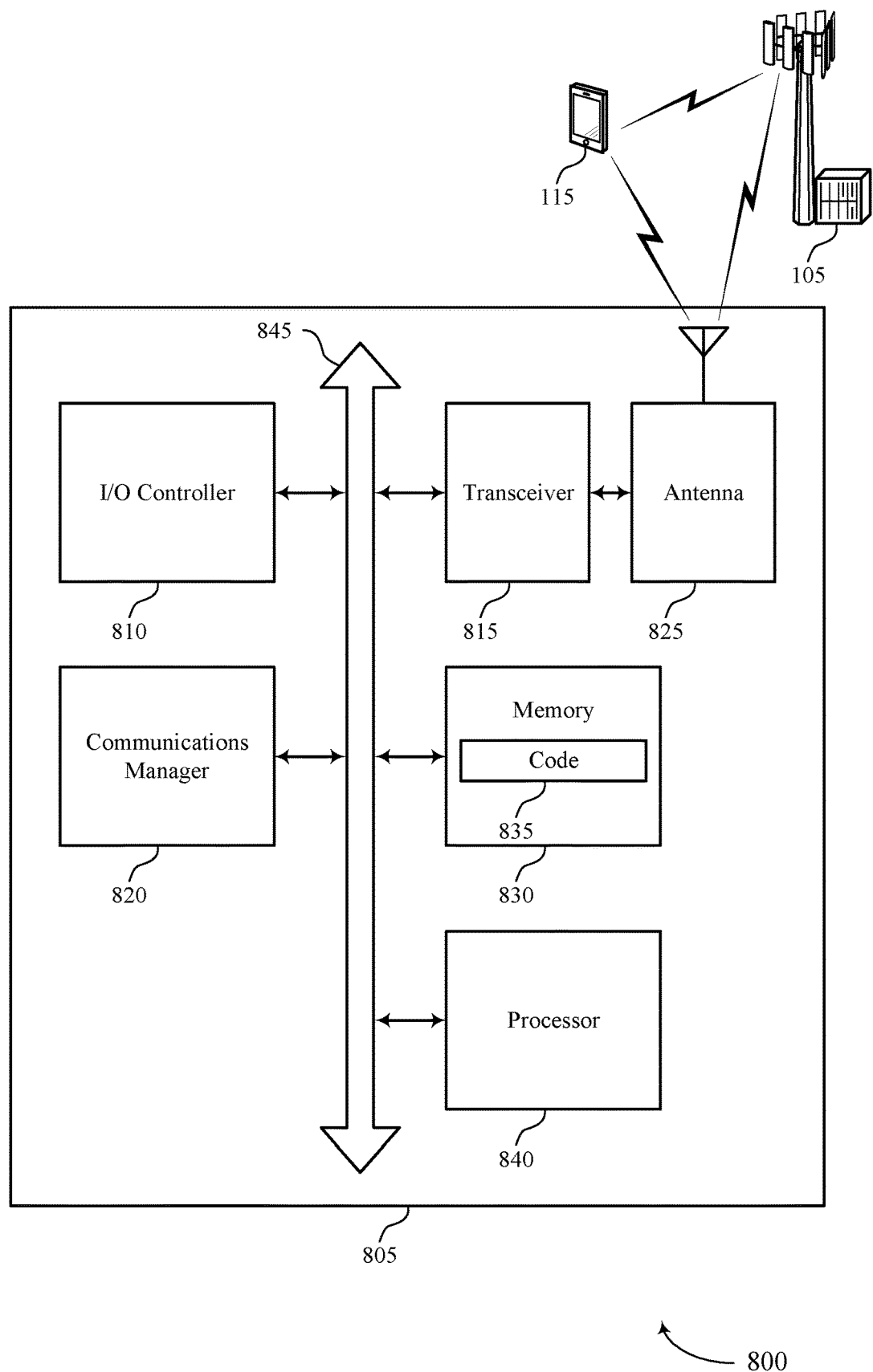
FIG. 8 shows a diagram of a system including a device that supports techniques for communicating HARQ feedback in accordance with aspects of the present disclosure.

FIG. 8 shows a diagram of a system 800 including a device 805 that supports techniques for communicating HARQ feedback in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for communicating HARQ feedback). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for deferring, to a target TTI, transmission of a first feedback message that is in accordance with a first type of HARQ codebook. The communications manager 820 may be configured as or otherwise support a means for receiving, from a base station and during a reception time interval, DCI that triggers the UE to schedule a second feedback message that is in accordance with a second type of HARQ codebook that is different from the first type of HARQ codebook. The communications manager 820 may be configured as or otherwise support a means for determining whether to cancel transmission of the first feedback message during the target TTI based on a minimum processing time of the UE and a time difference between the reception time interval and the target TTI. The communications manager 820 may be configured as or otherwise support a means for transmitting at least one of the first feedback message or the second feedback message in accordance with the determining.

By including or configuring the communications manager 820 in accordance with examples as described herein, the device 805 may support techniques for improved communication reliability, improved scheduling of HARQ feedback, reduced latency, reduced power consumption, more efficient utilization of communication resources, improved coordination between devices, and longer battery life, among other benefits.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for communicating HARQ feedback as described herein, or the processor 840 and the memory 830 may be otherwise configured to perform or support such operations.

Figure 9:
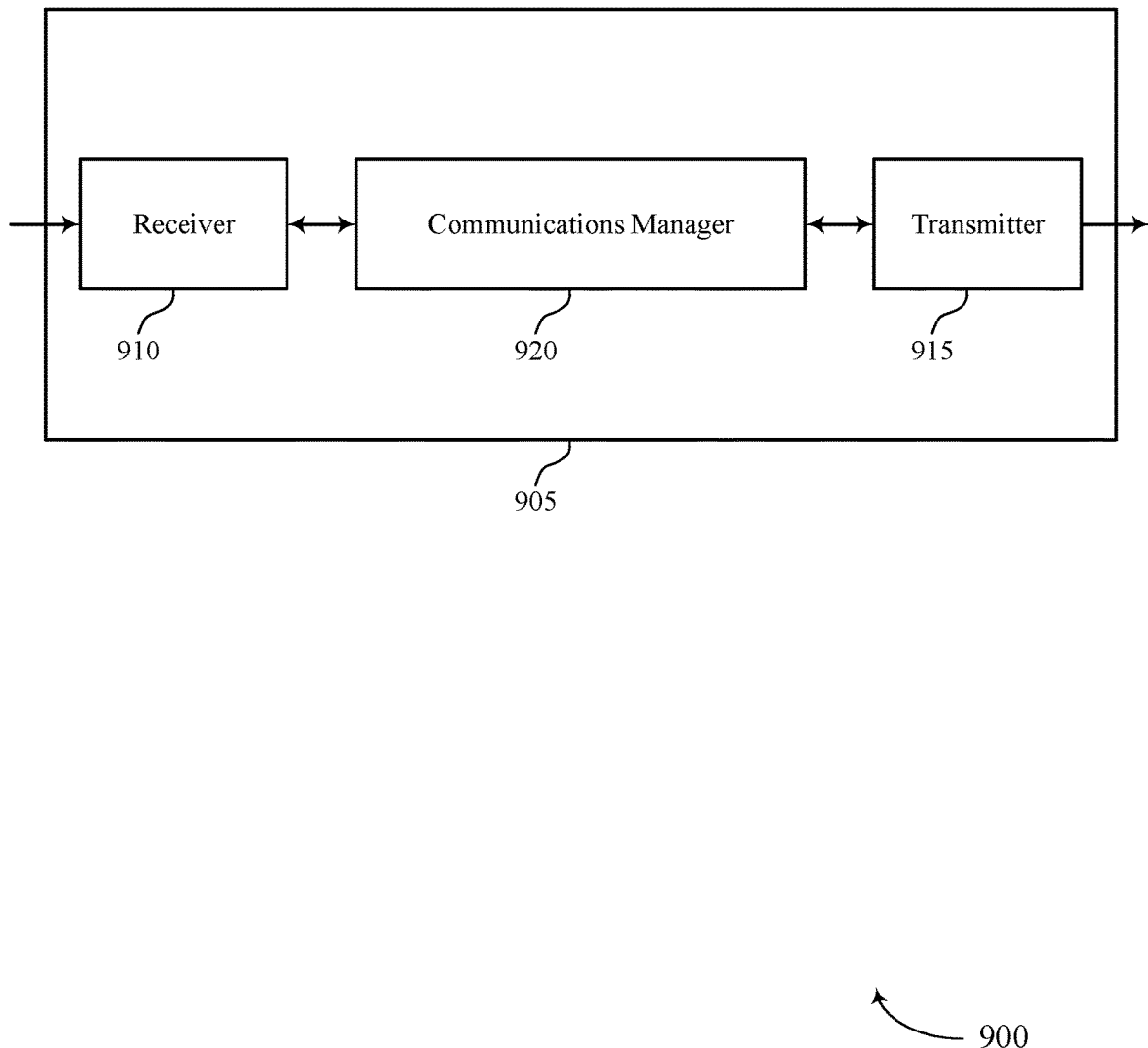
FIGS. 9 and 10 show block diagrams of devices that support techniques for communicating HARQ feedback in accordance with aspects of the present disclosure.

FIG. 9 shows a block diagram 900 of a device 905 that supports techniques for communicating HARQ feedback in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for communicating HARQ feedback). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for communicating HARQ feedback). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for communicating HARQ feedback as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for determining that a UE is configured to defer, to a target TTI, transmission of a first feedback message that is in accordance with a first type of HARQ codebook. The communications manager 920 may be configured as or otherwise support a means for transmitting, for reception during a reception time interval, DCI that triggers the UE to schedule a second feedback message that is in accordance with a second type of HARQ codebook that is different from the first type of HARQ codebook. The communications manager 920 may be configured as or otherwise support a means for determining whether the UE is to cancel transmission of the first feedback message during the target TTI based on a minimum processing time of the UE and a time difference between the reception time interval and the target TTI. The communications manager 920 may be configured as or otherwise support a means for receiving at least one of the first feedback message or the second feedback message in accordance with the determining.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing, reduced power consumption, and more efficient utilization of communication resources by supporting the communication or cancellation of HARQ feedback based on a minimum processing time of a UE.

Figure 10:
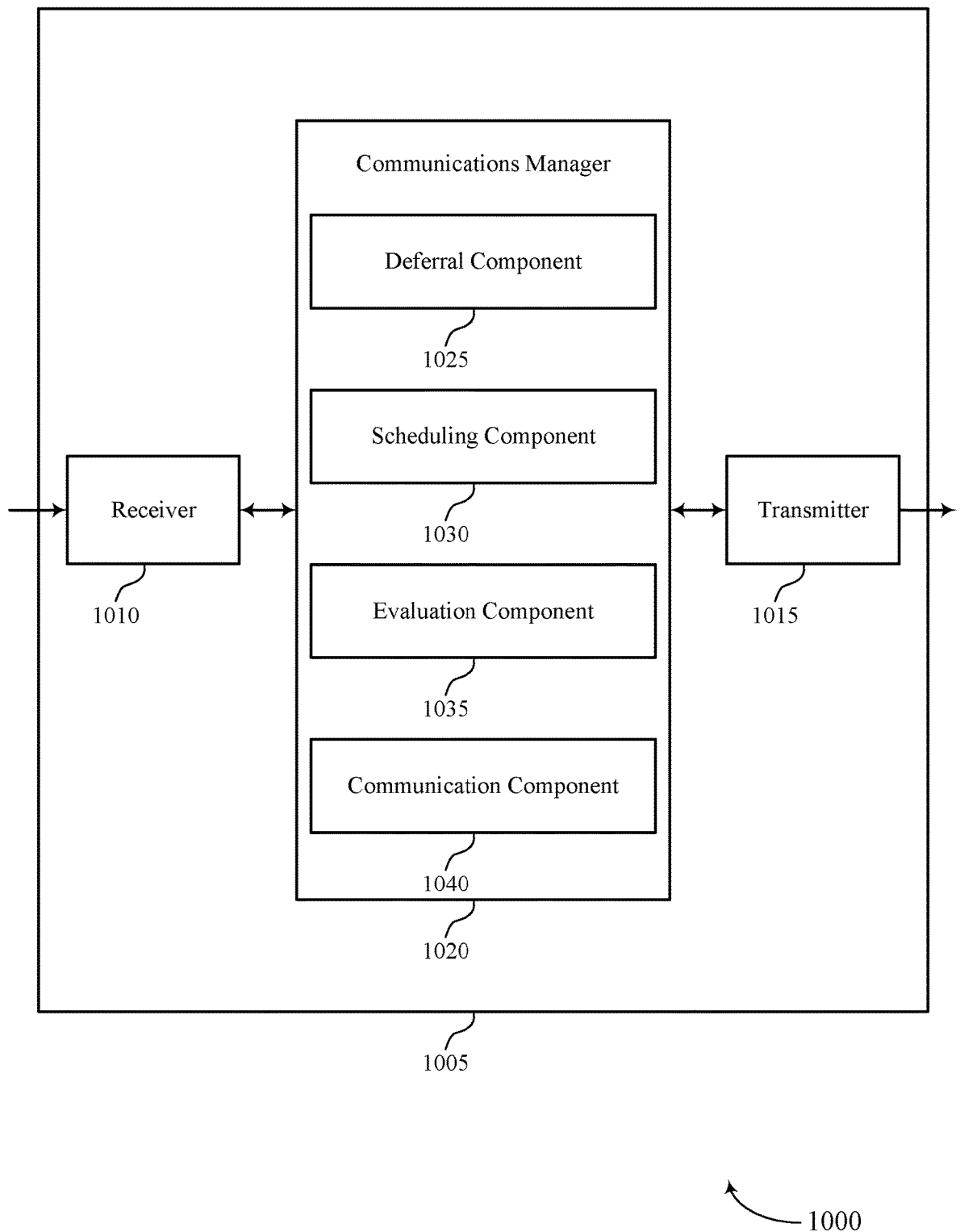

FIG. 10 shows a block diagram 1000 of a device 1005 that supports techniques for communicating HARQ feedback in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for communicating HARQ feedback). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for communicating HARQ feedback). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for communicating HARQ feedback as described herein. For example, the communications manager 1020 may include a deferral component 1025, a scheduling component 1030, an evaluation component 1035, a communication component 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The deferral component 1025 may be configured as or otherwise support a means for determining that a UE is configured to defer, to a target TTI, transmission of a first feedback message that is in accordance with a first type of HARQ codebook. The scheduling component 1030 may be configured as or otherwise support a means for transmitting, for reception during a reception time interval, DCI that triggers the UE to schedule a second feedback message that is in accordance with a second type of HARQ codebook that is different from the first type of HARQ codebook. The evaluation component 1035 may be configured as or otherwise support a means for determining whether the UE is to cancel transmission of the first feedback message during the target TTI based on a minimum processing time of the UE and a time difference between the reception time interval and the target TTI. The communication component 1040 may be configured as or otherwise support a means for receiving at least one of the first feedback message or the second feedback message in accordance with the determining.

Figure 11:
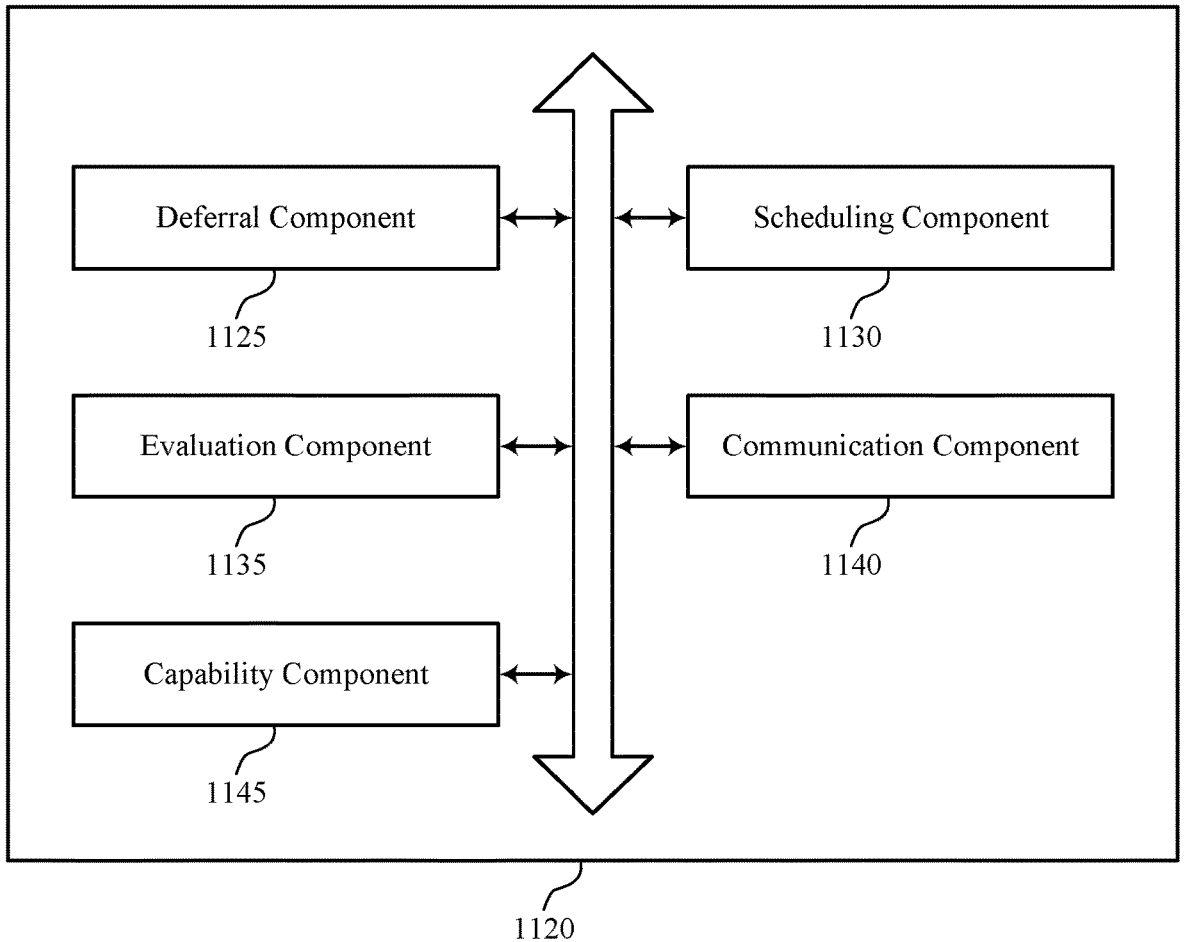
FIG. 11 shows a block diagram of a communications manager that supports techniques for communicating HARQ feedback in accordance with aspects of the present disclosure.

FIG. 11 shows a block diagram 1100 of a communications manager 1120 that supports techniques for communicating HARQ feedback in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for communicating HARQ feedback as described herein. For example, the communications manager 1120 may include a deferral component 1125, a scheduling component 1130, an evaluation component 1135, a communication component 1140, a capability component 1145, or any combination thereof. Each of these components may communicate, directly or indirectly, with one another (e.g., via one or more buses).

The communications manager 1120 may support wireless communication at a base station in accordance with examples as disclosed herein. The deferral component 1125 may be configured as or otherwise support a means for determining that a UE is configured to defer, to a target TTI, transmission of a first feedback message that is in accordance with a first type of HARQ codebook. The scheduling component 1130 may be configured as or otherwise support a means for transmitting, for reception during a reception time interval, DCI that triggers the UE to schedule a second feedback message that is in accordance with a second type of HARQ codebook that is different from the first type of HARQ codebook. The evaluation component 1135 may be configured as or otherwise support a means for determining whether the UE is to cancel transmission of the first feedback message during the target TTI based on a minimum processing time of the UE and a time difference between the reception time interval and the target TTI. The communication component 1140 may be configured as or otherwise support a means for receiving at least one of the first feedback message or the second feedback message in accordance with the determining.

In some examples, the capability component 1145 may be configured as or otherwise support a means for receiving, from the UE, a capability message that indicates the minimum processing time of the UE.

In some examples, the evaluation component 1135 may be configured as or otherwise support a means for determining that the UE is to cancel the transmission of the first feedback message during the target TTI based on the time difference between the reception time interval and the target TTI being greater than the minimum processing time.

In some examples, the second feedback message is received during a scheduled TTI that overlaps with the target TTI based on the transmission of the first feedback message during the target TTI being canceled.

In some examples, the DCI requests for the UE to include feedback for the first feedback message in the second feedback message based on the time difference between the reception time interval and the target TTI being greater than the minimum processing time.

In some examples, to support receiving at least one of the first feedback message or the second feedback message, the communication component 1140 may be configured as or otherwise support a means for receiving the first feedback message during the target TTI based on the time difference between the reception time interval and the target TTI being less than the minimum processing time. In some examples, to support receiving at least one of the first feedback message or the second feedback message, the communication component 1140 may be configured as or otherwise support a means for receiving the second feedback message during a second TTI after the target TTI.

In some examples, the first feedback message is associated with an SPS configuration according to which the UE and the base station communicate.

In some examples, the first type of HARQ codebook is a type 1 HARQ codebook or a type 2 HARQ codebook. In some examples, the second type of HARQ codebook is a type 3 HARQ codebook or a dynamic grant HARQ codebook.

In some examples, the minimum processing time of the UE is a same value as a PUSCH processing value of the UE.

Figure 12:
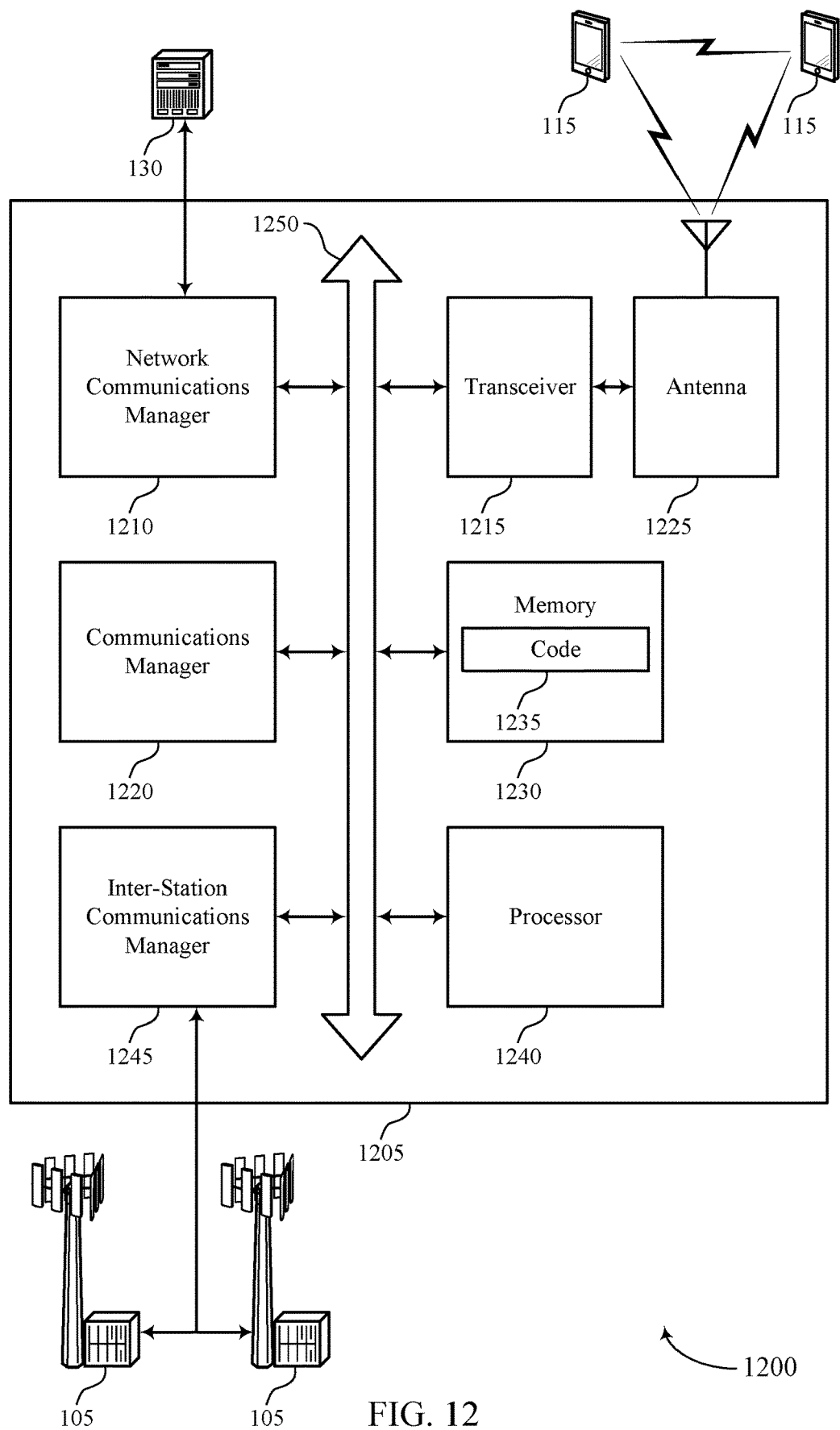
FIG. 12 shows a diagram of a system including a device that supports techniques for communicating HARQ feedback in accordance with aspects of the present disclosure.

FIG. 12 shows a diagram of a system 1200 including a device 1205 that supports techniques for communicating HARQ feedback in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for communicating HARQ feedback). For example, the device 1205 or a component of the device 1205 may include a processor 1240 and memory 1230 coupled with or to the processor 1240, the processor 1240 and memory 1230 configured to perform various functions described herein.

The inter-station communications manager 1245 may manage communications with other base stations 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for determining that a UE is configured to defer, to a target TTI, transmission of a first feedback message that is in accordance with a first type of HARQ codebook. The communications manager 1220 may be configured as or otherwise support a means for transmitting, for reception during a reception time interval, DCI that triggers the UE to schedule a second feedback message that is in accordance with a second type of HARQ codebook that is different from the first type of HARQ codebook. The communications manager 1220 may be configured as or otherwise support a means for determining whether the UE is to cancel transmission of the first feedback message during the target TTI based on a minimum processing time of the UE and a time difference between the reception time interval and the target TTI. The communications manager 1220 may be configured as or otherwise support a means for receiving at least one of the first feedback message or the second feedback message in accordance with the determining.

By including or configuring the communications manager 1220 in accordance with examples as described herein, the device 1205 may support techniques for improved communication reliability, improved scheduling of HARQ feedback, reduced latency, reduced power consumption, more efficient utilization of communication resources, and improved coordination between devices, among other benefits.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for communicating HARQ feedback as described herein, or the processor 1240 and the memory 1230 may be otherwise configured to perform or support such operations.

Figure 13:
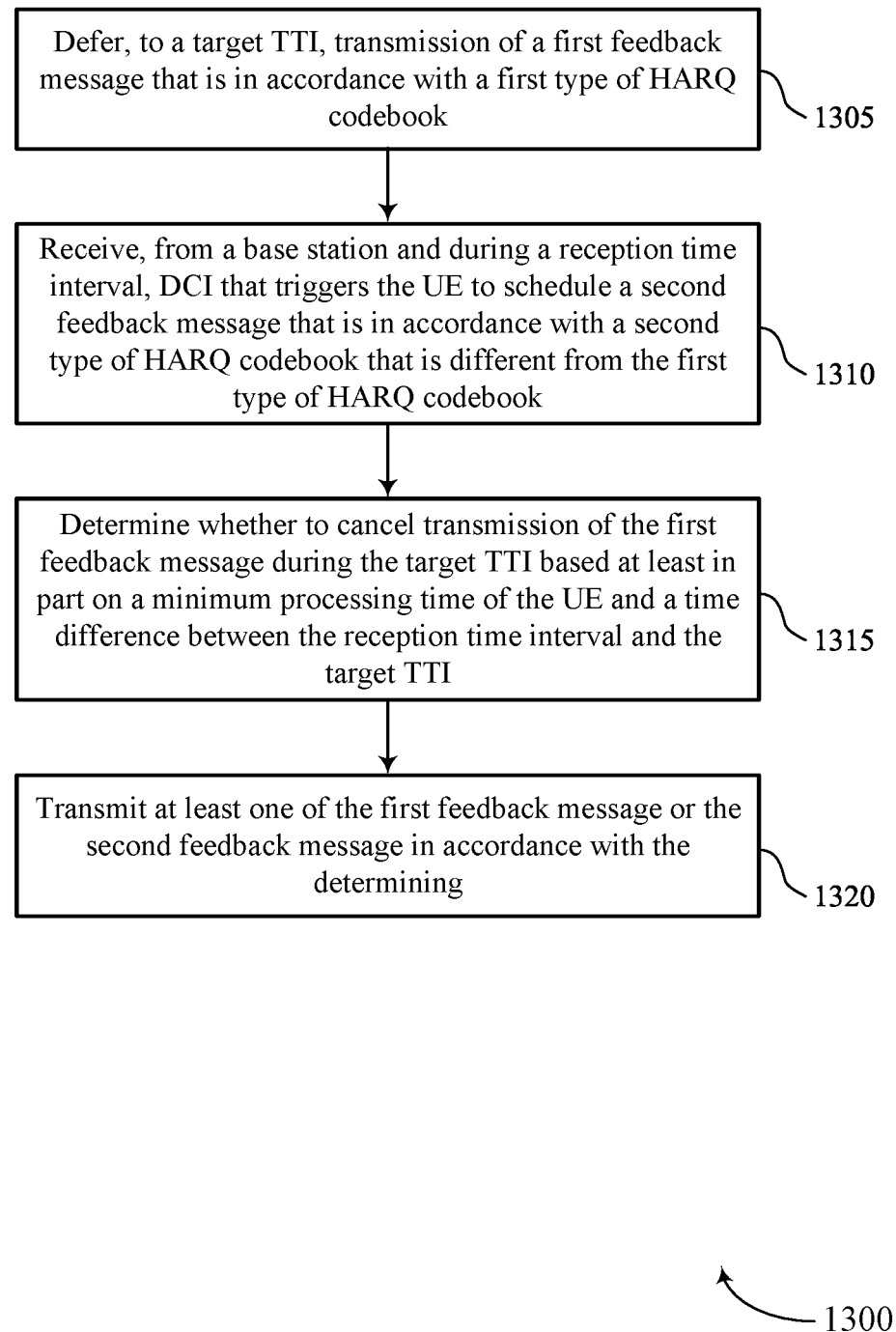
FIGS. 13 through 18 show flowcharts illustrating methods that support techniques for communicating HARQ feedback in accordance with aspects of the present disclosure.

FIG. 13 shows a flowchart illustrating a method 1300 that supports techniques for communicating HARQ feedback in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include deferring, to a target TTI, transmission of a first feedback message that is in accordance with a first type of HARQ codebook. The operations of 1305 may be performed in accordance with examples as disclosed herein. In some examples, aspects of the operations of 1305 may be performed by a deferral component 725 as described with reference to FIG. 7.

At 1310, the method may include receiving, from a base station and during a reception time interval, DCI that triggers the UE to schedule a second feedback message that is in accordance with a second type of HARQ codebook that is different from the first type of HARQ codebook. The operations of 1310 may be performed in accordance with examples as disclosed herein. In some examples, aspects of the operations of 1310 may be performed by a scheduling component 730 as described with reference to FIG. 7.

At 1315, the method may include determining whether to cancel transmission of the first feedback message during the target TTI based on a minimum processing time of the UE and a time difference between the reception time interval and the target TTI. The operations of 1315 may be performed in accordance with examples as disclosed herein. In some examples, aspects of the operations of 1315 may be performed by an evaluation component 735 as described with reference to FIG. 7.

At 1320, the method may include transmitting at least one of the first feedback message or the second feedback message in accordance with the determining. The operations of 1320 may be performed in accordance with examples as disclosed herein. In some examples, aspects of the operations of 1320 may be performed by a communication component 740 as described with reference to FIG. 7.

Figure 14:
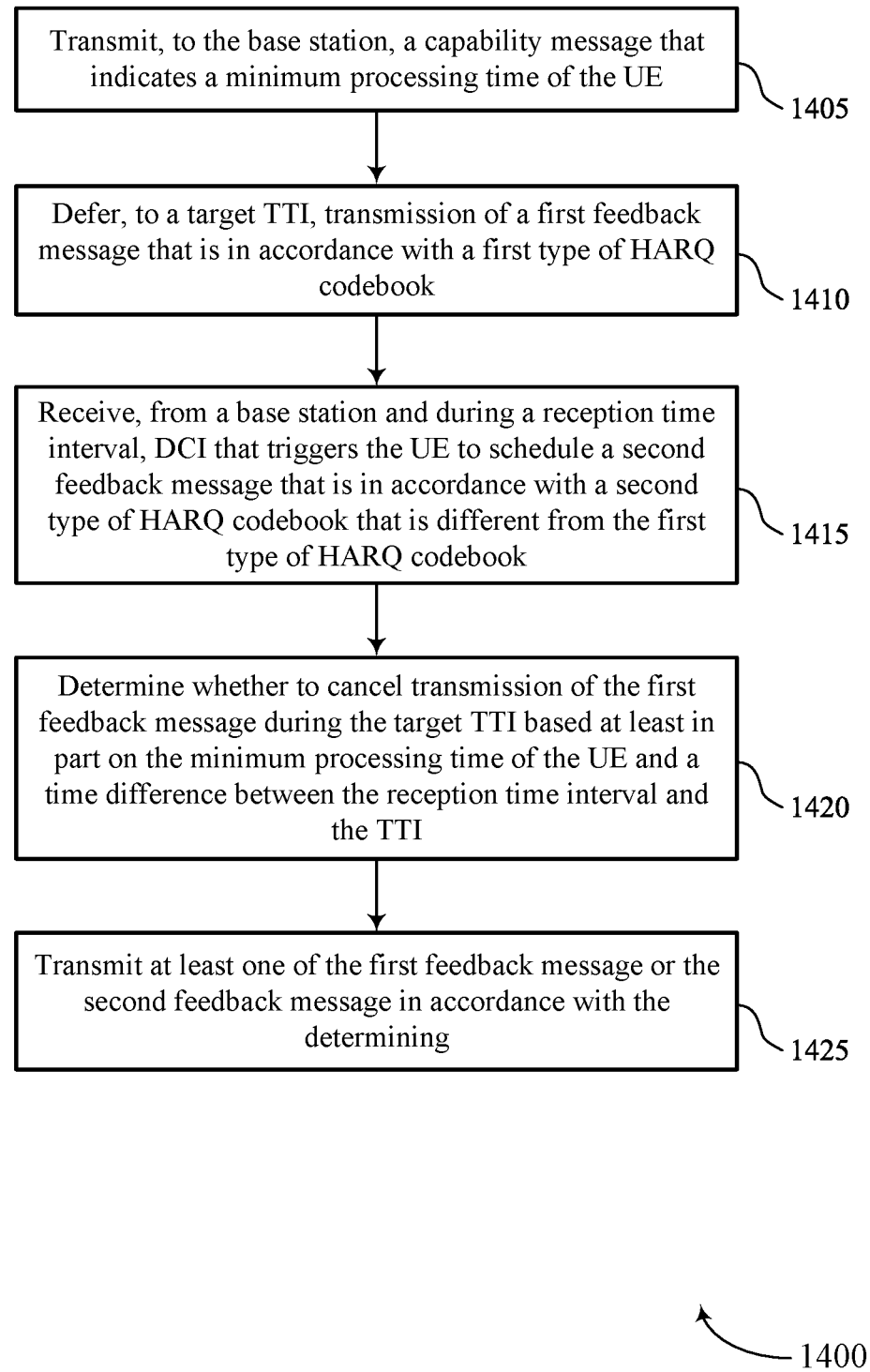

FIG. 14 shows a flowchart illustrating a method 1400 that supports techniques for communicating HARQ feedback in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include transmitting, to the base station, a capability message that indicates a minimum processing time of the UE. The operations of 1405 may be performed in accordance with examples as disclosed herein. In some examples, aspects of the operations of 1405 may be performed by a capability component 745 as described with reference to FIG. 7.

At 1410, the method may include deferring, to a target TTI, transmission of a first feedback message that is in accordance with a first type of HARQ codebook. The operations of 1410 may be performed in accordance with examples as disclosed herein. In some examples, aspects of the operations of 1410 may be performed by a deferral component 725 as described with reference to FIG. 7.

At 1415, the method may include receiving, from a base station and during a reception time interval, DCI that triggers the UE to schedule a second feedback message that is in accordance with a second type of HARQ codebook that is different from the first type of HARQ codebook. The operations of 1415 may be performed in accordance with examples as disclosed herein. In some examples, aspects of the operations of 1415 may be performed by a scheduling component 730 as described with reference to FIG. 7.

At 1420, the method may include determining whether to cancel transmission of the first feedback message during the target TTI based on the minimum processing time of the UE and a time difference between the reception time interval and the target TTI. The operations of 1420 may be performed in accordance with examples as disclosed herein. In some examples, aspects of the operations of 1420 may be performed by an evaluation component 735 as described with reference to FIG. 7.

At 1425, the method may include transmitting at least one of the first feedback message or the second feedback message in accordance with the determining. The operations of 1425 may be performed in accordance with examples as disclosed herein. In some examples, aspects of the operations of 1425 may be performed by a communication component 740 as described with reference to FIG. 7.

Figure 15:
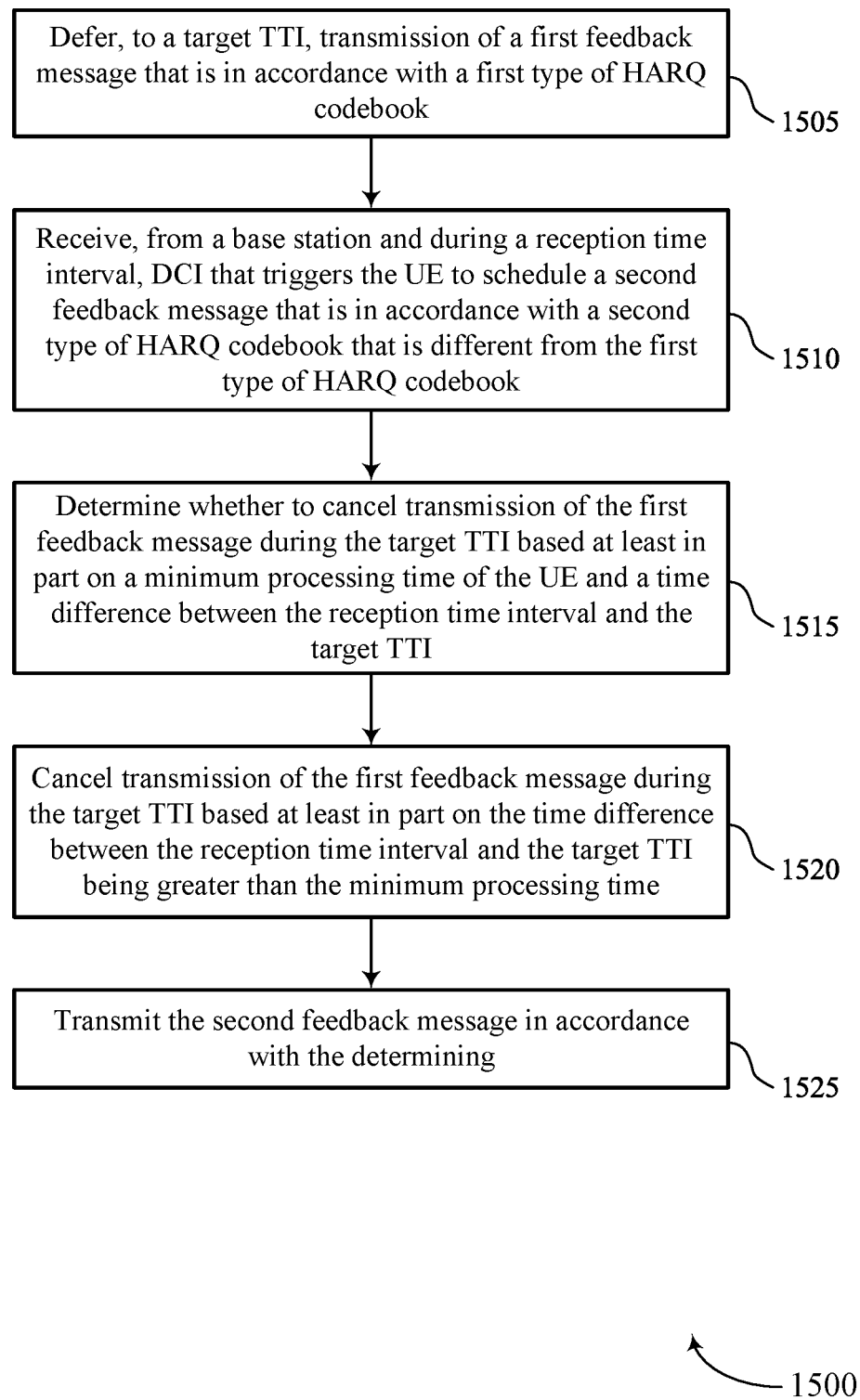

FIG. 15 shows a flowchart illustrating a method 1500 that supports techniques for communicating HARQ feedback in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include deferring, to a target TTI, transmission of a first feedback message that is in accordance with a first type of HARQ codebook. The operations of 1505 may be performed in accordance with examples as disclosed herein. In some examples, aspects of the operations of 1505 may be performed by a deferral component 725 as described with reference to FIG. 7.

At 1510, the method may include receiving, from a base station and during a reception time interval, DCI that triggers the UE to schedule a second feedback message that is in accordance with a second type of HARQ codebook that is different from the first type of HARQ codebook. The operations of 1510 may be performed in accordance with examples as disclosed herein. In some examples, aspects of the operations of 1510 may be performed by a scheduling component 730 as described with reference to FIG. 7.

At 1515, the method may include determining whether to cancel transmission of the first feedback message during the target TTI based on a minimum processing time of the UE and a time difference between the reception time interval and the target TTI. The operations of 1515 may be performed in accordance with examples as disclosed herein. In some examples, aspects of the operations of 1515 may be performed by an evaluation component 735 as described with reference to FIG. 7.

At 1520, the method may include canceling transmission of the first feedback message during the target TTI based on the time difference between the reception time interval and the target TTI being greater than the minimum processing time. The operations of 1520 may be performed in accordance with examples as disclosed herein. In some examples, aspects of the operations of 1520 may be performed by an evaluation component 735 as described with reference to FIG. 7.

At 1525, the method may include transmitting the second feedback message in accordance with the determining. The operations of 1525 may be performed in accordance with examples as disclosed herein. In some examples, aspects of the operations of 1525 may be performed by a communication component 740 as described with reference to FIG. 7.

Figure 16:
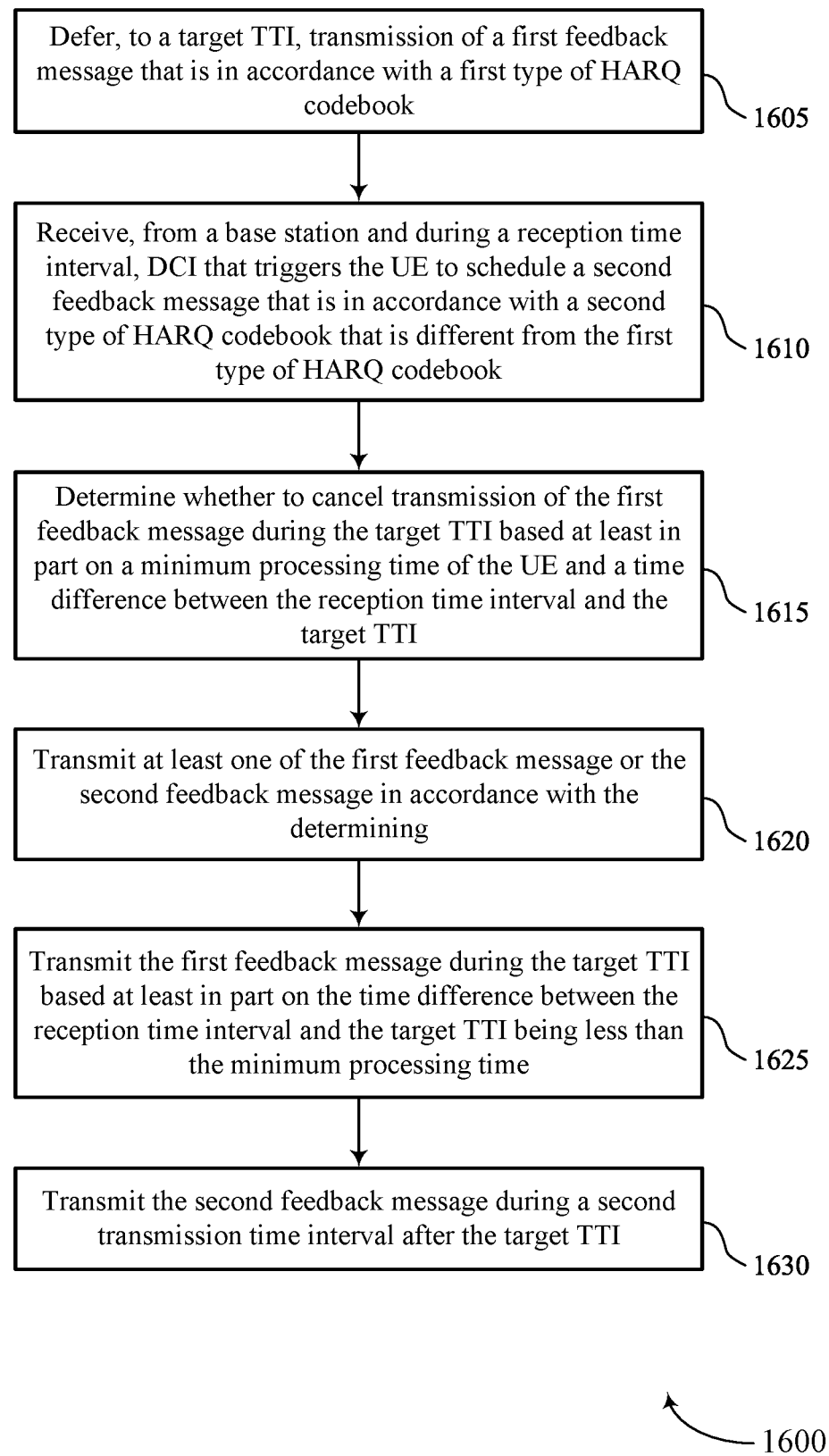

FIG. 16 shows a flowchart illustrating a method 1600 that supports techniques for communicating HARQ feedback in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include deferring, to a target TTI, transmission of a first feedback message that is in accordance with a first type of HARQ codebook. The operations of 1605 may be performed in accordance with examples as disclosed herein. In some examples, aspects of the operations of 1605 may be performed by a deferral component 725 as described with reference to FIG. 7.

At 1610, the method may include receiving, from a base station and during a reception time interval, DCI that triggers the UE to schedule a second feedback message that is in accordance with a second type of HARQ codebook that is different from the first type of HARQ codebook. The operations of 1610 may be performed in accordance with examples as disclosed herein. In some examples, aspects of the operations of 1610 may be performed by a scheduling component 730 as described with reference to FIG. 7.

At 1615, the method may include determining whether to cancel transmission of the first feedback message during the target TTI based on a minimum processing time of the UE and a time difference between the reception time interval and the target TTI. The operations of 1615 may be performed in accordance with examples as disclosed herein. In some examples, aspects of the operations of 1615 may be performed by an evaluation component 735 as described with reference to FIG. 7.

At 1620, the method may include transmitting at least one of the first feedback message or the second feedback message in accordance with the determining. The operations of 1620 may be performed in accordance with examples as disclosed herein. In some examples, aspects of the operations of 1620 may be performed by a communication component 740 as described with reference to FIG. 7.

At 1625, to transmit at least one of the first feedback message or the second feedback message, the method may include transmitting the first feedback message during the target TTI based on the time difference between the reception time interval and the target TTI being less than the minimum processing time. The operations of 1625 may be performed in accordance with examples as disclosed herein. In some examples, aspects of the operations of 1625 may be performed by a communication component 740 as described with reference to FIG. 7.

At 1630, to transmit at least one of the first feedback message or the second feedback message, the method may include transmitting the second feedback message during a second TTI after the target TTI. The operations of 1630 may be performed in accordance with examples as disclosed herein. In some examples, aspects of the operations of 1630 may be performed by a communication component 740 as described with reference to FIG. 7.

Figure 17:
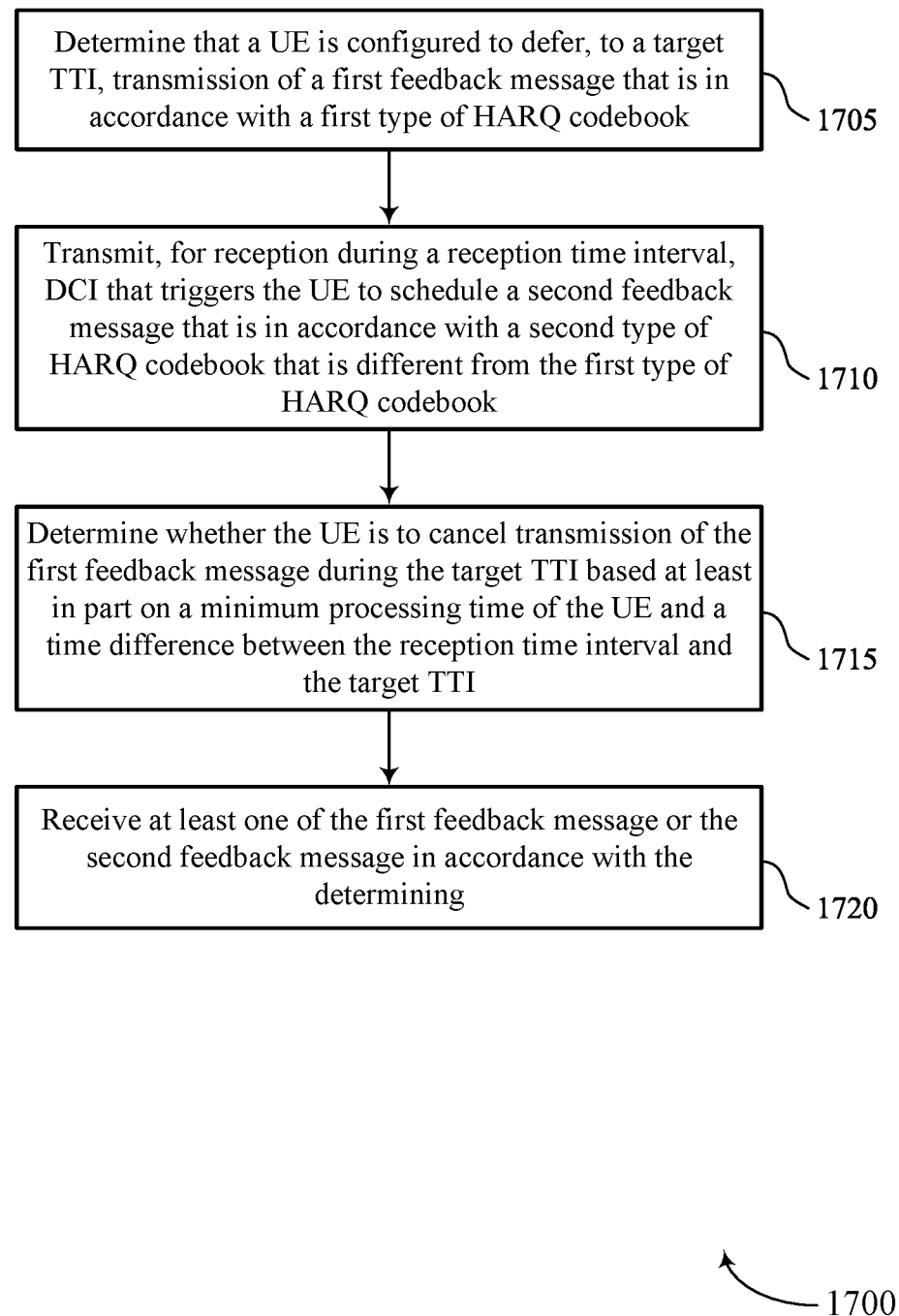

FIG. 17 shows a flowchart illustrating a method 1700 that supports techniques for communicating HARQ feedback in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include determining that a UE is configured to defer, to a target TTI, transmission of a first feedback message that is in accordance with a first type of HARQ codebook. The operations of 1705 may be performed in accordance with examples as disclosed herein. In some examples, aspects of the operations of 1705 may be performed by a deferral component 1125 as described with reference to FIG. 11.

At 1710, the method may include transmitting, for reception during a reception time interval, DCI that triggers the UE to schedule a second feedback message that is in accordance with a second type of HARQ codebook that is different from the first type of HARQ codebook. The operations of 1710 may be performed in accordance with examples as disclosed herein. In some examples, aspects of the operations of 1710 may be performed by a scheduling component 1130 as described with reference to FIG. 11.

At 1715, the method may include determining whether the UE is to cancel transmission of the first feedback message during the target TTI based on a minimum processing time of the UE and a time difference between the reception time interval and the target TTI. The operations of 1715 may be performed in accordance with examples as disclosed herein. In some examples, aspects of the operations of 1715 may be performed by an evaluation component 1135 as described with reference to FIG. 11.

At 1720, the method may include receiving at least one of the first feedback message or the second feedback message in accordance with the determining. The operations of 1720 may be performed in accordance with examples as disclosed herein. In some examples, aspects of the operations of 1720 may be performed by a communication component 1140 as described with reference to FIG. 11.

Figure 18:
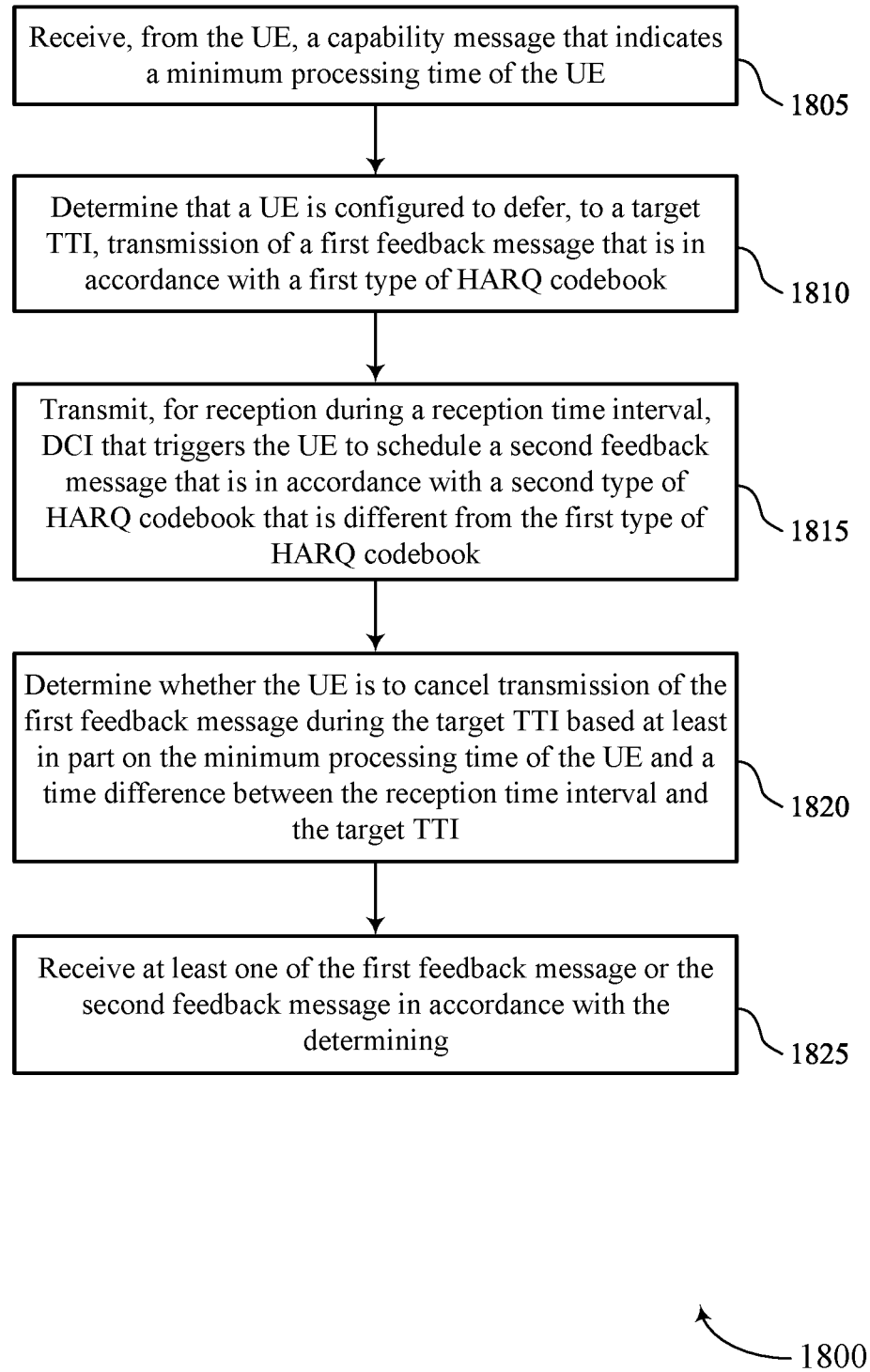

FIG. 18 shows a flowchart illustrating a method 1800 that supports techniques for communicating HARQ feedback in accordance with aspects of the present disclosure. The operations of the method 1800 may be implemented by a base station or its components as described herein. For example, the operations of the method 1800 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1805, the method may include receiving, from the UE, a capability message that indicates a minimum processing time of the UE. The operations of 1805 may be performed in accordance with examples as disclosed herein. In some examples, aspects of the operations of 1805 may be performed by a capability component 1145 as described with reference to FIG. 11.

At 1810, the method may include determining that a UE is configured to defer, to a target TTI, transmission of a first feedback message that is in accordance with a first type of HARQ codebook. The operations of 1810 may be performed in accordance with examples as disclosed herein. In some examples, aspects of the operations of 1810 may be performed by a deferral component 1125 as described with reference to FIG. 11.

At 1815, the method may include transmitting, for reception during a reception time interval, DCI that triggers the UE to schedule a second feedback message that is in accordance with a second type of HARQ codebook that is different from the first type of HARQ codebook. The operations of 1815 may be performed in accordance with examples as disclosed herein. In some examples, aspects of the operations of 1815 may be performed by a scheduling component 1130 as described with reference to FIG. 11.

At 1820, the method may include determining whether the UE is to cancel transmission of the first feedback message during the target TTI based on the minimum processing time of the UE and a time difference between the reception time interval and the target TTI. The operations of 1820 may be performed in accordance with examples as disclosed herein. In some examples, aspects of the operations of 1820 may be performed by an evaluation component 1135 as described with reference to FIG. 11.

At 1825, the method may include receiving at least one of the first feedback message or the second feedback message in accordance with the determining. The operations of 1825 may be performed in accordance with examples as disclosed herein. In some examples, aspects of the operations of 1825 may be performed by a communication component 1140 as described with reference to FIG. 11.

The following provides an overview of aspects of the present disclosure:

Aspect 1: A method for wireless communication at a UE, comprising: deferring, to a target TTI, transmission of a first feedback message that is in accordance with a first type of HARQ codebook; receiving, from a network device and during a reception time interval, DCI that triggers the UE to schedule a second feedback message that is in accordance with a second type of HARQ codebook that is different from the first type of HARQ codebook; determining whether to cancel transmission of the first feedback message during the target TTI based at least in part on a minimum processing time of the UE and a time difference between the reception time interval and the target TTI; and transmitting at least one of the first feedback message or the second feedback message in accordance with the determining.

Aspect 2: The method of aspect 1, further comprising: transmitting, to the network device and before deferring the transmission of the first feedback message, a capability message that indicates the minimum processing time of the UE.

Aspect 3: The method of any of aspects 1 through 2, further comprising: canceling transmission of the first feedback message during the target TTI based at least in part on the time difference between the reception time interval and the target TTI being greater than the minimum processing time.

Aspect 4: The method of aspect 3, wherein the second feedback message is transmitted during a scheduled TTI that overlaps with the target TTI based at least in part on canceling transmission of the first feedback message.

Aspect 5: The method of any of aspects 3 through 4, wherein the DCI requests for the UE to include feedback for the first feedback message in the second feedback message based at least in part on the time difference between the reception time interval and the target TTI being greater than the minimum processing time.

Aspect 6: The method of any of aspects 1 through 2, wherein transmitting at least one of the first feedback message or the second feedback message comprises: transmitting the first feedback message during the target TTI based at least in part on the time difference between the reception time interval and the target TTI being less than the minimum processing time; and transmitting the second feedback message during a second TTI after the target TTI.

Aspect 7: The method of any of aspects 1 through 6, wherein the first feedback message is associated with an SPS configuration according to which the UE and the network device communicate.

Aspect 8: The method of any of aspects 1 through 7, wherein the first type of HARQ codebook is a type 1 HARQ codebook or a type 2 HARQ codebook, and the second type of HARQ codebook is a type 3 HARQ codebook or a dynamic grant HARQ codebook.

Aspect 9: The method of any of aspects 1 through 8, wherein the minimum processing time of the UE is a same value as a PUSCH processing value of the UE.

Aspect 10: A method for wireless communication at a network device, comprising: determining that a UE is configured to defer, to a target TTI, transmission of a first feedback message that is in accordance with a first type of HARQ codebook; transmitting, for reception during a reception time interval, DCI that triggers the UE to schedule a second feedback message that is in accordance with a second type of HARQ codebook that is different from the first type of HARQ codebook; determining whether the UE is to cancel transmission of the first feedback message during the target TTI based at least in part on a minimum processing time of the UE and a time difference between the reception time interval and the target TTI; and receiving at least one of the first feedback message or the second feedback message in accordance with the determining.

Aspect 11: The method of aspect 10, further comprising: receiving, from the UE, a capability message that indicates the minimum processing time of the UE.

Aspect 12: The method of any of aspects 10 through 11, further comprising: determining that the UE is to cancel the transmission of the first feedback message during the target TTI based at least in part on the time difference between the reception time interval and the target TTI being greater than the minimum processing time.

Aspect 13: The method of aspect 12, wherein the second feedback message is received during a scheduled TTI that overlaps with the target TTI based at least in part on the transmission of the first feedback message during the target TTI being canceled.

Aspect 14: The method of any of aspects 12 through 13, wherein the DCI requests for the UE to include feedback for the first feedback message in the second feedback message based at least in part on the time difference between the reception time interval and the target TTI being greater than the minimum processing time.

Aspect 15: The method of any of aspects 10 through 11, wherein receiving at least one of the first feedback message or the second feedback message comprises: receiving the first feedback message during the target TTI based at least in part on the time difference between the reception time interval and the target TTI being less than the minimum processing time; and receiving the second feedback message during a second TTI after the target TTI.

Aspect 16: The method of any of aspects 10 through 15, wherein the first feedback message is associated with an SPS configuration according to which the UE and the network device communicate.

Aspect 17: The method of any of aspects 10 through 16, wherein the first type of HARQ codebook is a type 1 HARQ codebook or a type 2 HARQ codebook, and the second type of HARQ codebook is a type 3 HARQ codebook or a dynamic grant HARQ codebook.

Aspect 18: The method of any of aspects 10 through 17, wherein the minimum processing time of the UE is a same value as a PUSCH processing value of the UE.

Aspect 19: An apparatus for wireless communication at a UE, comprising a processor; memory coupled with the processor; and instructions stored in the memory and executable by the processor to cause the apparatus to perform a method of any of aspects 1 through 9.

Aspect 20: An apparatus for wireless communication at a UE, comprising at least one means for performing a method of any of aspects 1 through 9.

Aspect 21: A non-transitory computer-readable medium storing code for wireless communication at a UE, the code comprising instructions executable by a processor to perform a method of any of aspects 1 through 9.

Aspect 22: An apparatus for wireless communication at a network device, comprising a processor; memory coupled with the processor; and instructions stored in the memory and executable by the processor to cause the apparatus to perform a method of any of aspects 10 through 18.

Aspect 23: An apparatus for wireless communication at a network device, comprising at least one means for performing a method of any of aspects 10 through 18.

Aspect 24: A non-transitory computer-readable medium storing code for wireless communication at a network device, the code comprising instructions executable by a processor to perform a method of any of aspects 10 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    deferring, to a target transmission time interval, transmission of a first feedback message that is in accordance with a first type of hybrid automatic repeat request codebook;
    receiving, from a network device and during a reception time interval, downlink control information that triggers the UE to schedule a second feedback message that is in accordance with a second type of hybrid automatic repeat request codebook that is different from the first type of hybrid automatic repeat request codebook;
    determining whether to cancel transmission of the first feedback message during the target transmission time interval based at least in part on a minimum processing time of the UE and on a time difference between the reception of the downlink control information interval and the target transmission time interval, wherein the minimum processing time comprises an uplink processing time; and
    transmitting at least one of the first feedback message or the second feedback message in accordance with the determining.

2. The method of claim 1, further comprising:
    transmitting, to the network device and before deferring the transmission of the first feedback message, a capability message that indicates the minimum processing time of the UE.

3. The method of claim 1, further comprising:
    canceling transmission of the first feedback message during the target transmission time interval based at least in part on the time difference between the reception of the downlink control information and the target transmission time interval being greater than the minimum processing time.

4. The method of claim 3, wherein the second feedback message is transmitted during a scheduled transmission time interval that overlaps with the target transmission time interval based at least in part on canceling transmission of the first feedback message.

5. The method of claim 3, wherein the downlink control information requests for the UE to include feedback for the first feedback message in the second feedback message based at least in part on the time difference between the reception of the downlink control information and the target transmission time interval being greater than the minimum processing time.

6. The method of claim 1, wherein transmitting at least one of the first feedback message or the second feedback message comprises:
    transmitting the first feedback message during the target transmission time interval based at least in part on the time difference between the reception of the downlink control information and the target transmission time interval being less than the minimum processing time; and transmitting the second feedback message during a second transmission time interval after the target transmission time interval.

7. The method of claim 1, wherein the first feedback message is associated with a semi-persistent scheduling configuration according to which the UE and the network device communicate.

8. The method of claim 1, wherein:
the first type of hybrid automatic repeat request codebook is a type 1 hybrid automatic repeat request codebook or a type 2 hybrid automatic repeat request codebook, and
the second type of hybrid automatic repeat request codebook is a type 3 hybrid automatic repeat request codebook or a dynamic grant hybrid automatic repeat request codebook.

9. The method of claim 1, wherein the minimum processing time of the UE is a same value as a physical uplink shared channel processing value of the UE.

10. A method for wireless communication at a network device, comprising:
determining that a user equipment (UE) is configured to defer, to a target transmission time interval, transmission of a first feedback message that is in accordance with a first type of hybrid automatic repeat request codebook;
transmitting, for reception during a reception time interval, downlink control information that triggers the UE to schedule a second feedback message that is in accordance with a second type of hybrid automatic repeat request codebook that is different from the first type of hybrid automatic repeat request codebook;
determining whether the UE is to cancel transmission of the first feedback message during the target transmission time interval based at least in part on a minimum processing time of the UE and on a time difference between a reception of the downlink control information and the target transmission time interval, wherein the minimum processing time comprises an uplink processing time; and
receiving at least one of the first feedback message or the second feedback message in accordance with the determining.

11. The method of claim 10, further comprising:
receiving, from the UE, a capability message that indicates the minimum processing time of the UE.

12. The method of claim 10, further comprising:
determining that the UE is to cancel the transmission of the first feedback message during the target transmission time interval based at least in part on the time difference between the reception of the downlink control information and the target transmission time interval being greater than the minimum processing time.

13. The method of claim 12, wherein the second feedback message is received during a scheduled transmission time interval that overlaps with the target transmission time interval based at least in part on the transmission of the first feedback message during the target transmission time interval being canceled.

14. The method of claim 12, wherein the downlink control information requests for the UE to include feedback for the first feedback message in the second feedback message based at least in part on the time difference between the reception of the downlink control information and the target transmission time interval being greater than the minimum processing time.

15. The method of claim 10, wherein receiving at least one of the first feedback message or the second feedback message comprises:
receiving the first feedback message during the target transmission time interval based at least in part on the time difference between the reception of the downlink control information and the target transmission time interval being less than the minimum processing time; and
receiving the second feedback message during a second transmission time interval after the target transmission time interval.

16. The method of claim 10, wherein the first feedback message is associated with a semi-persistent scheduling configuration according to which the UE and the network device communicate.

17. The method of claim 10, wherein:
the first type of hybrid automatic repeat request codebook is a type 1 hybrid automatic repeat request codebook or a type 2 hybrid automatic repeat request codebook, and
the second type of hybrid automatic repeat request codebook is a type 3 hybrid automatic repeat request codebook or a dynamic grant hybrid automatic repeat request codebook.

18. The method of claim 10, wherein the minimum processing time of the UE is a same value as a physical uplink shared channel processing value of the UE.

19. A user equipment (UE), comprising:
a processor;
memory coupled with the processor; and
instructions stored in the memory and executable by the processor to cause the UE to:
defer, to a target transmission time interval, transmission of a first feedback message that is in accordance with a first type of hybrid automatic repeat request codebook;
receive, from a network device and during a reception time interval, downlink control information that triggers the UE to schedule a second feedback message that is in accordance with a second type of hybrid automatic repeat request codebook that is different from the first type of hybrid automatic repeat request codebook;
determine whether to cancel transmission of the first feedback message during the target transmission time interval based at least in part on a minimum processing time of the UE and on a time difference between the reception of the downlink control information and the target transmission time interval, wherein the minimum processing time comprises an uplink processing time; and
transmit at least one of the first feedback message or the second feedback message in accordance with the determining.

20. The UE of claim 19, wherein the instructions are further executable by the processor to cause the UE to:
transmit, to the network device and before deferring the transmission of the first feedback message, a capability message that indicates the minimum processing time of the UE.

21. The UE of claim 19, wherein the instructions are further executable by the processor to cause the UE to:
cancel transmission of the first feedback message during the target transmission time interval based at least in part on the time difference between the reception of the downlink control information and the target transmission time interval being greater than the minimum processing time.

22. The UE of claim 21, wherein the second feedback message is transmitted during a scheduled transmission time interval that overlaps with the target transmission time interval based at least in part on canceling transmission of the first feedback message.

23. The UE of claim 21, wherein the downlink control information requests for the UE to include feedback for the first feedback message in the second feedback message based at least in part on the time difference between the reception of the downlink control information and the target transmission time interval being greater than the minimum processing time.

24. The UE of claim 19, wherein the instructions to transmit at least one of the first feedback message or the second feedback message are executable by the processor to cause the UE to:
- transmit the first feedback message during the target transmission time interval based at least in part on the time difference between the reception of the downlink control information and the target transmission time interval being less than the minimum processing time; and
- transmit the second feedback message during a second transmission time interval after the target transmission time interval.

25. The UE of claim 19, wherein the first feedback message is associated with a semi-persistent scheduling configuration according to which the UE and the network device communicate.

26. The UE of claim 19, wherein:
- the first type of hybrid automatic repeat request codebook is a type 1 hybrid automatic repeat request codebook or a type 2 hybrid automatic repeat request codebook, and
- the second type of hybrid automatic repeat request codebook is a type 3 hybrid automatic repeat request codebook or a dynamic grant hybrid automatic repeat request codebook.

27. A network device, comprising:
a processor;
memory coupled with the processor; and
instructions stored in the memory and executable by the processor to cause the network device to:
- determine that a user equipment (UE) is configured to defer, to a target transmission time interval, transmission of a first feedback message that is in accordance with a first type of hybrid automatic repeat request codebook;
- transmit, for reception during a reception time interval, downlink control information that triggers the UE to schedule a second feedback message that is in accordance with a second type of hybrid automatic repeat request codebook that is different from the first type of hybrid automatic repeat request codebook;
- determine whether the UE is to cancel transmission of the first feedback message during the target transmission time interval based at least in part on a minimum processing time of the UE and on a time difference between a reception of the downlink control information and the target transmission time interval, wherein the minimum processing time comprises an uplink processing time; and
- receive at least one of the first feedback message or the second feedback message in accordance with the determining.

28. The network device of claim 27, wherein the instructions are further executable by the processor to cause the network device to:
receive, from the UE, a capability message that indicates the minimum processing time of the UE.

29. The network device of claim 27, wherein the instructions are further executable by the processor to cause the network device to:
determine that the UE is to cancel the transmission of the first feedback message during the target transmission time interval based at least in part on the time difference between the reception of the downlink control information and the target transmission time interval being greater than the minimum processing time.

30. The network device of claim 27, wherein the instructions to receive at least one of the first feedback message or the second feedback message are executable by the processor to cause the network device to:
- receive the first feedback message during the target transmission time interval based at least in part on the time difference between the reception of the downlink control information and the target transmission time interval being less than the minimum processing time; and
- receive the second feedback message during a second transmission time interval after the target transmission time interval.

* * * * *